US012042781B2

(12) United States Patent
Zheng et al.

(10) Patent No.: US 12,042,781 B2
(45) Date of Patent: Jul. 23, 2024

(54) SURFACE-MODIFIED CERIA-ZIRCONIA MIXED OXIDE COMPOUND FOR GASOLINE EXHAUST

(71) Applicant: JOHNSON MATTHEY PUBLIC LIMITED COMPANY, London (GB)

(72) Inventors: Qinghe Zheng, Wayne, PA (US); Jing Lu, Wayne, PA (US); Michael Howard, Wayne, PA (US); Andrea Eva Pascui, Reading (GB); Kerry Simmance, Reading (GB); Janet Fisher, Reading (GB)

(73) Assignee: JOHNSON MATTHEY PUBLIC LIMITED COMPANY, London (GB)

( * ) Notice: Subject to any disclaimer, the term of this patent is extended or adjusted under 35 U.S.C. 154(b) by 0 days.

(21) Appl. No.: 18/158,700

(22) Filed: Jan. 24, 2023

(65) Prior Publication Data
US 2023/0241585 A1 Aug. 3, 2023

Related U.S. Application Data

(60) Provisional application No. 63/267,523, filed on Feb. 3, 2022.

(51) Int. Cl.
*B01J 21/04* (2006.01)
*B01D 53/94* (2006.01)
(Continued)

(52) U.S. Cl.
CPC ............ *B01J 23/10* (2013.01); *B01D 53/945* (2013.01); *B01J 23/002* (2013.01); *B01J 23/34* (2013.01);
(Continued)

(58) Field of Classification Search
CPC ........ B01J 21/04; B01J 21/066; B01J 23/002; B01J 23/02; B01J 23/04; B01J 23/10;
(Continued)

(56) References Cited

U.S. PATENT DOCUMENTS 6,129,862 A 10/2000 Munakata
6,531,425 B2 3/2003 Golden
(Continued)

OTHER PUBLICATIONS

A. Newton, M. Dynamic Adsorbate/Reaction Induced Structural Change of Supported Metal Nanoparticles: Heterogeneous Catalysis and Beyond. Chemical Society Reviews 2008, 37 (12), 2644-2657. https://doi.org/10.1039/B707746G.
(Continued)

*Primary Examiner* — Cam N. Nguyen

(57) ABSTRACT

Provided is a composition comprising a ceria-zirconia mixed oxide, the ceria-zirconia mixed oxide being surface-modified with a perovskite type compound of formula (I); wherein formula (I) is defined by $A_{x-y}A'_yB_{1-z}B'_zO_3$; where: A is an ion of a metal selected from the group consisting of Li, Na, K, Cs, Mg, Sr, Ba, Ca, Y, La, Ce, Pr, Nd, and Gd; A' is an ion of a metal selected from the group consisting of Li, Na, K, Cs, Mg, Sr, Ba, Ca, Y, La, Ce, Pr, Nd, and Gd; B is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir; B' is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir; x is from 0.7 to 1; y is from 0 to 0.5; and z is from 0 to 0.5.

20 Claims, 4 Drawing Sheets

(51) Int. Cl.

| | |
|---|---|
| *B01J 21/06* | (2006.01) |
| *B01J 23/00* | (2006.01) |
| *B01J 23/02* | (2006.01) |
| *B01J 23/04* | (2006.01) |
| *B01J 23/10* | (2006.01) |
| *B01J 23/34* | (2006.01) |
| *B01J 23/38* | (2006.01) |
| *B01J 23/40* | (2006.01) |
| *B01J 23/42* | (2006.01) |
| *B01J 23/44* | (2006.01) |
| *B01J 23/46* | (2006.01) |
| *B01J 23/48* | (2006.01) |
| *B01J 23/54* | (2006.01) |
| *B01J 23/63* | (2006.01) |
| *B01J 23/70* | (2006.01) |
| *B01J 23/76* | (2006.01) |
| *B01J 23/83* | (2006.01) |
| *B01J 23/89* | (2006.01) |
| *B01J 35/04* | (2006.01) |
| *B01J 35/56* | (2024.01) |
| *B01J 37/02* | (2006.01) |
| *B01J 37/04* | (2006.01) |
| *B01J 37/08* | (2006.01) |
| *F01N 3/10* | (2006.01) |
| *F01N 3/28* | (2006.01) |

(52) U.S. Cl.
CPC ............ *B01J 23/44* (2013.01); *B01J 23/464* (2013.01); *B01J 23/83* (2013.01); *B01J 35/56* (2024.01); *B01J 37/0213* (2013.01); *B01J 37/0221* (2013.01); *B01J 37/0236* (2013.01); *B01J 37/0248* (2013.01); *B01J 37/04* (2013.01); *B01J 37/088* (2013.01); *B01D 2255/1021* (2013.01); *B01D 2255/1023* (2013.01); *B01D 2255/1025* (2013.01); *B01D 2255/402* (2013.01); *B01D 2255/407* (2013.01); *B01D 2255/908* (2013.01); *B01D 2255/9155* (2013.01); *F01N 3/101* (2013.01); *F01N 3/2803* (2013.01); *F01N 2370/02* (2013.01)

(58) Field of Classification Search
CPC ... B01J 23/34; B01J 23/38; B01J 23/40; B01J 23/42; B01J 23/44; B01J 23/46; B01J 23/48; B01J 23/54; B01J 23/63; B01J 23/70; B01J 23/76; B01J 23/83; B01J 23/89; B01J 23/894; B01J 23/8946; B01J 35/04; B01J 37/0213; B01J 37/0221; B01J 37/0236; B01J 37/0248; B01J 37/04; B01J 37/088; B01J 35/56; B01D 53/945; F01N 3/101; F01N 3/2828
See application file for complete search history.

(56) References Cited

U.S. PATENT DOCUMENTS

| | | | | |
|---|---|---|---|---|
| 6,558,831 | B1* | 5/2003 | Doshi | H01M 8/1231 429/495 |
| 7,014,825 | B2* | 3/2006 | Golden | F01N 3/281 423/247 |
| 7,070,752 | B2* | 7/2006 | Zeng | C01B 3/386 423/652 |
| 7,514,055 | B2 | 4/2009 | Golden | |
| 8,609,575 | B2* | 12/2013 | Talbot | B01J 37/0018 502/343 |
| 9,101,914 | B2* | 8/2015 | Ito | B01J 23/002 |
| 9,352,301 | B2* | 5/2016 | Ito | B01J 37/0244 |
| 9,649,596 | B2* | 5/2017 | Chang | B01D 53/9468 |
| 10,252,217 | B2* | 4/2019 | Zhang | B01J 37/038 |
| 10,478,808 | B2* | 11/2019 | D'Souza | B01J 23/18 |
| 11,179,704 | B2* | 11/2021 | Zheng | B01J 37/036 |
| 11,364,484 | B2* | 6/2022 | Fisher | B01J 37/0201 |
| 11,439,983 | B2* | 9/2022 | Nagaoka | B01J 21/066 |
| 11,484,866 | B2* | 11/2022 | Peng | B01J 21/04 |
| 11,559,793 | B2* | 1/2023 | Zheng | B01J 23/34 |
| 11,845,660 | B2* | 12/2023 | Uddi | B01J 35/651 |
| 2009/0263300 | A1* | 10/2009 | Yang | B01D 53/9418 428/116 |
| 2009/0324470 | A1 | 12/2009 | Alamdari | |
| 2012/0264031 | A1* | 10/2012 | Seabaugh | H01M 8/0215 429/495 |
| 2015/0182954 | A1 | 7/2015 | Nazarpoor et al. | |
| 2016/0332151 | A1* | 11/2016 | Li | C01B 3/40 |
| 2017/0095803 | A1* | 4/2017 | Nazarpoor | B01J 23/34 |
| 2019/0336950 | A1 | 11/2019 | Zheng | |
| 2020/0179908 | A1* | 6/2020 | Simmance | B01J 35/0013 |
| 2020/0276536 | A1 | 9/2020 | Zheng | |

OTHER PUBLICATIONS

Alifanti, M.; Florea, M.; Cortes-Corberan, V.; Endruschat, U.; Delmon, B.; Pârvulescu, V. I. Effect of LaCoO3 Perovskite Deposition on Ceria-Based Supports on Total Oxidation of VOC. Catalysis Today 2006, 112 (1), 169-173. https://doi.org/10.1016/j.cattod.2005.11.017.

Alifanti, M.; Florea, M.; Părvulescu, V. I. Ceria-Based Oxides as Supports for LaCoO3 Perovskite; Catalysts for Total Oxidation of VOC. Applied Catalysis B: Environmental 2007, 70 (1), 400-405. https://doi.org/10.1016/j.apcatb.2005.10.037.

Hammouda, Samia Ben et al., "Reactivity of a novelCeria-Perovskite composites CeO2—LaMO3 (M<ce:glyph name="dbnd"/>Cu, Fe) for the catalytic wet peroxidation oxidation of a new emergent pollutant 'Bisphenol F': Characterization, kinetic and mechanism studies," Applied Catalysis B: Environmental, Manuscript 2017.

Haribal, Vasudev Pralhad, et al. "Iron-Doped BaMnO3 for Hybrid Water Splitting and Syngas Generation with Exceptional Conversions," Dept. of Chemical and Biomolecular Engineering, North Carolina State Univ, Research News https://doi.org/10.1002/cssc.201700699.

Haribal, Vasudev Pralhad, et al. "Iron-Doped BaMnO3 for Hybrid Water Splitting and Syngas Generation," ChemSusChem 10, pp. 1-8 2017.

Keav, S.; Matam, S. K.; Ferri, D.; Weidenkaff, A. Structured Perovskite-Based Catalysts and Their Application as Three-Way Catalytic Converters—A Review. Catalysts 2014, 4 (3), 226-255. https://doi.org/10.3390/catal4030226.

Kubicek, Markus, et al., "Perovskite oxides—a review on a versatile material class for solar-to-fuel conversion processes," The Royal Society of Chemistry, J. Mater. Chem A. 5, pp. 11983-12000 2017.

Mishra, Amit, et al., "Oxygen Vacancy Creation Energy in Mn-Containing Perovskites: An Effective Indicator for Chemical Looping with Oxygen Uncoupling," Chem Mater. 31, pp. 689-698, 2019.

Rabelo-Neto, R. C.; Sales, H. B. E.; Inocêncio, C. V. M.; Varga, E.; Oszko, A.; Erdohelyi, A.; Noronha, F. B.; Mattos, L. V. CO2 Reforming of Methane over Supported LaNiO3 Perovskite-Type Oxides. Applied Catalysis B: Environmental 2018, 221, 349-361. https://doi.org/10.1016/j.apcatb.2017.09.022.

Wang, Hai-Feng, et al., "A Model to Understand the Oxygen Vacancy Formation in Zr-Doped CeO2: Electrostatic Interaction and Structural Relaxation," J. Phys. Chem C 113, pp. 10229-10232, 2009.

Zhu, H.; Zhang, P.; Dai, S. Recent Advances of Lanthanum-Based Perovskite Oxides for Catalysis. ACS Catal. 2015, 5 (11), 6370-6385. https://doi.org/10.1021/acscatal.5b01667.

Zhu, Xing et al., "Perovskites as Geo-Inspired Oxygen Storage Materials for Chemical Looping and Three-Way Catalysis: A Perspective," ACS Catal. 8, pp. 8213-8236, 2018.

\* cited by examiner

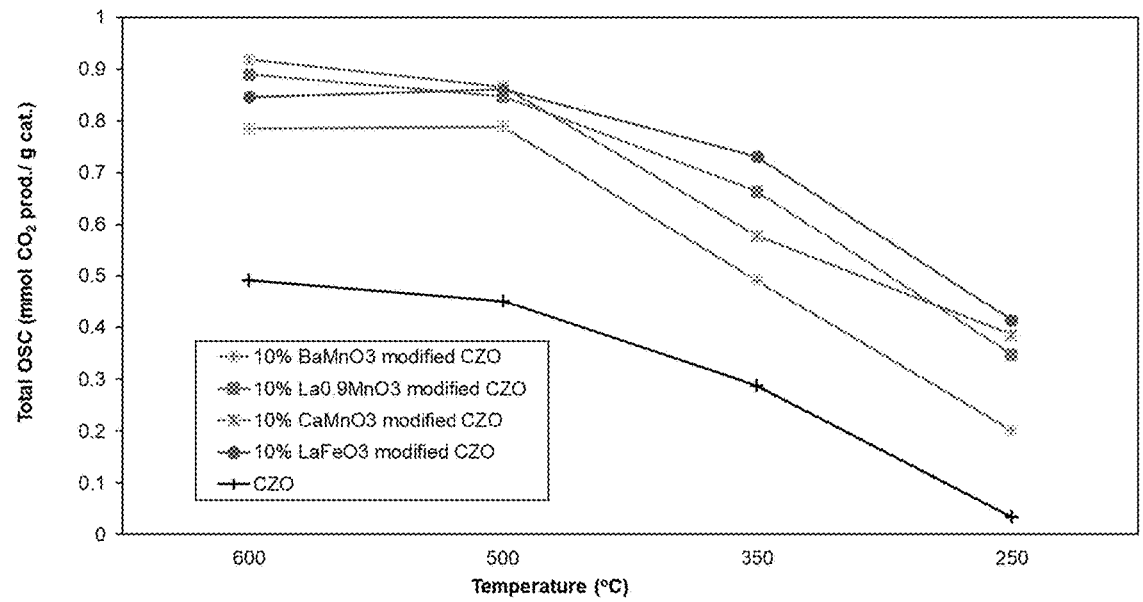
FIG. 3
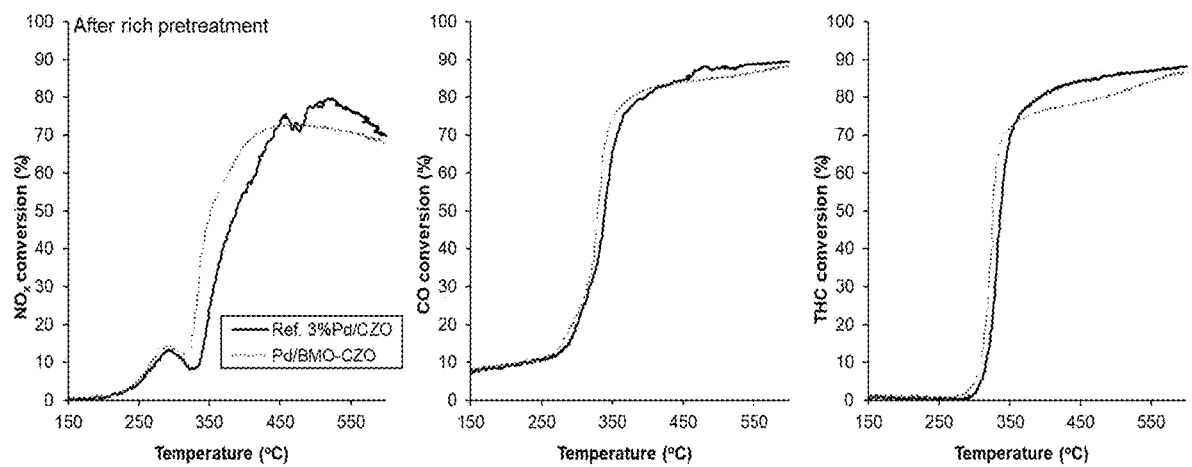
FIG. 4a   FIG. 4b   FIG. 4c

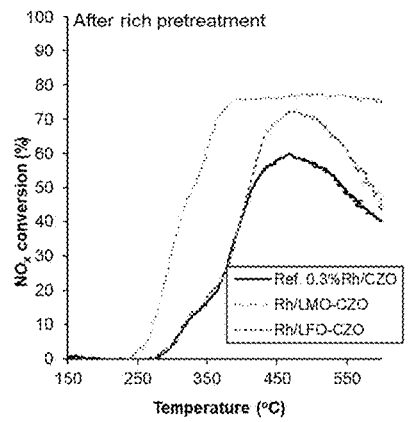 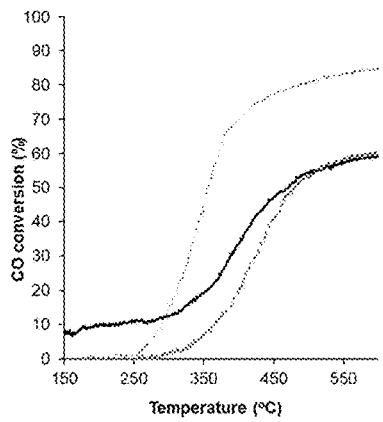 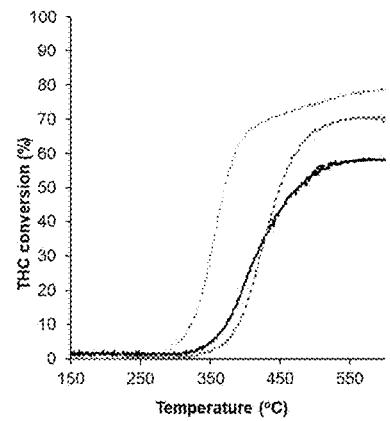
FIG. 5a FIG. 5b FIG. 5c
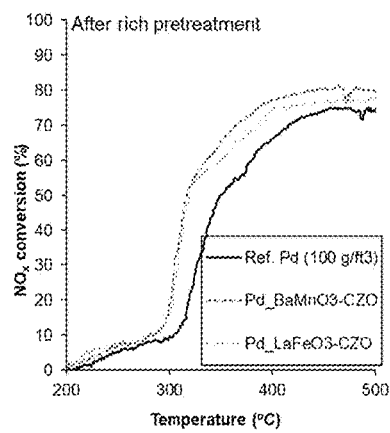 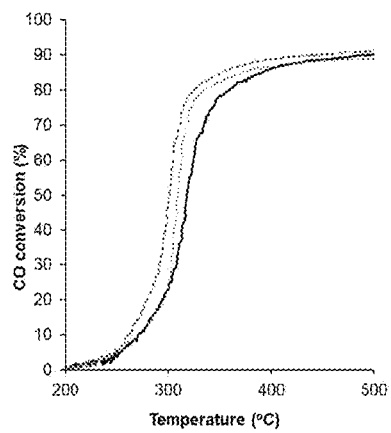 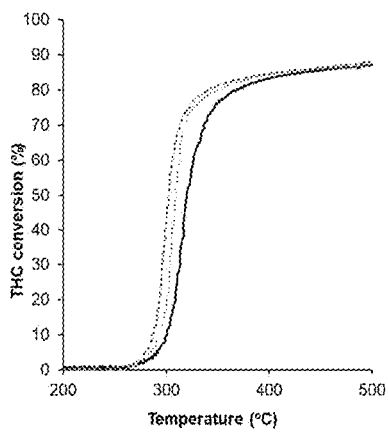
FIG. 6a FIG. 6b FIG. 6c

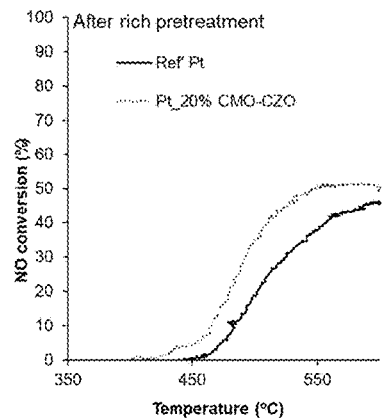 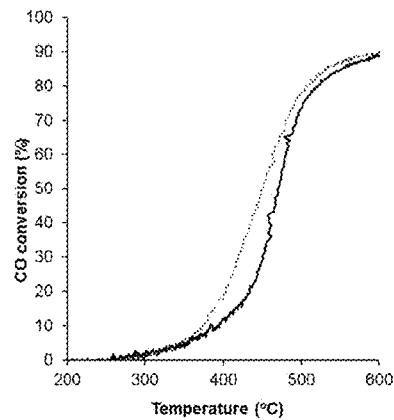 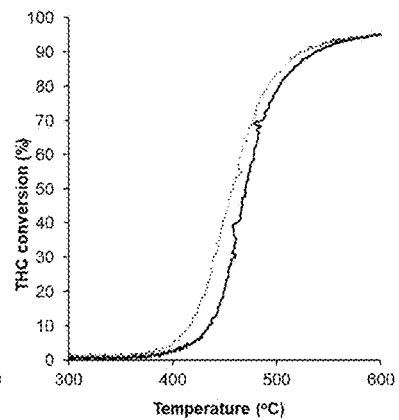
FIG. 7a     FIG. 7b     FIG. 7c
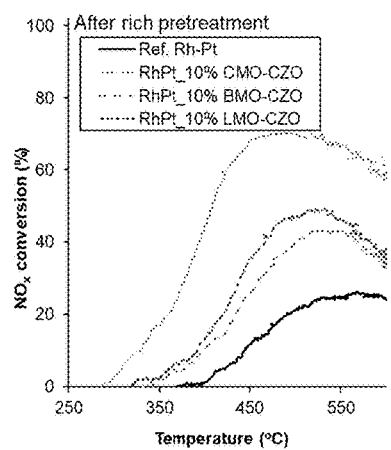 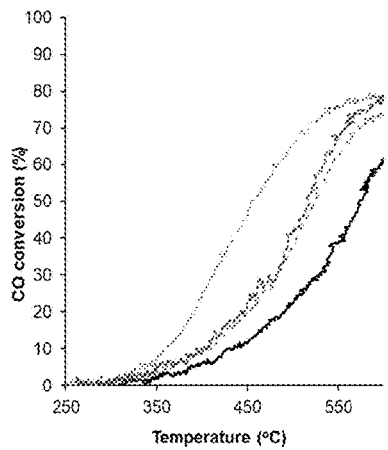 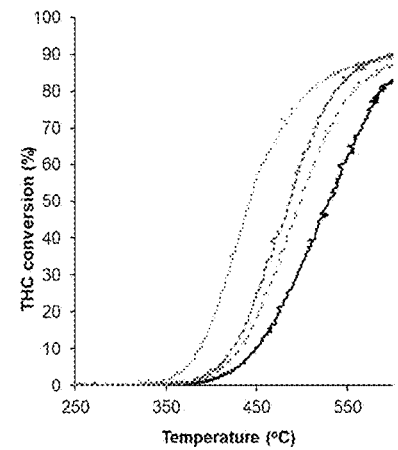
FIG. 8a     FIG. 8b     FIG. 8c

SURFACE-MODIFIED CERIA-ZIRCONIA MIXED OXIDE COMPOUND FOR GASOLINE EXHAUST

FIELD OF THE INVENTION

The invention relates to a composition comprising a ceria-zirconia mixed oxide, the ceria-zirconia mixed oxide being surface-modified with a perovskite type compound, methods of manufacturing such a composition, compositions obtained or obtainable by such methods, a catalyst article, an emissions treatment system and a method of treating an exhaust gas.

BACKGROUND OF THE INVENTION

A three-way catalyst (TWC) allows simultaneous conversions (~98%) of CO, HCs and $NO_x$ from gasoline engine exhaust to innocuous compounds at stoichiometric air-to-fuel ratio. Specifically, the oxidation of CO and HCs to $CO_2$ and steam ($H_2O$) is mainly catalyzed by Pd, while the reduction of $NO_x$ to $N_2$ is mainly catalyzed by Rh. Modern TWCs use supported platinum group metal (hereinafter "PGM") catalysts (Pd, Rh, Pt, etc.) deposited on a single, double or multilayer support, with the support material consisting of metal oxides with high specific surface area, primarily stabilized alumina and ceria-containing oxygen storage materials. The supported catalyst is washcoated on a ceramic monolithic substrate.

Cerium oxide ($Ce_xO_y$), well known for its high oxygen storage capacity (OSC) due to the function of the $Ce^{4+}/Ce^{3+}$ redox pair, plays an important role in TWC performance. Besides providing high surface area for PGM metal dispersion, $Ce_xO_y$ can also assist the feed-back control of stoichiometric condition by uptaking or donating oxygen during fuel lean/rich perturbations. Further incorporation of zirconium oxide ($ZrO_2$) into $Ce_xO_y$ fluorite structure (denoted as CZO) improves the thermal stability of $Ce_xO_y$, and enhances the mobility of lattice oxygen through the formation of oxygen vacancies. Other proprietary elements (Y, Nd, La, Pr, etc.) are also added to OSC formulas to further enhance the TWC performance.

$ABO_{3-\delta}$ perovskite-type materials are known in the art and can exhibit significant swings in oxygen non-stoichiometry $\delta$ through the reaction with gas phase oxygen. Perovskites with advanced compositions also present OSC capacity and intrinsic TWC activity. Generally, the OSC and catalytic activity of perovskite oxides are largely dependent on the nature of the B-site cation, while the A-site cation is found to be important in the perovskite structural formation by influencing vacancy density and charge-valence balance. The oxygen uptake and release are associated with the existence of structural defects and the change of oxidation state of the B-site cation. At a temperature below 600° C., suprafacial oxygen species ($\alpha$) are adsorbed on the oxide surface, while at higher temperatures, bulk oxygen from the lattice, referred to as interfacial oxygen ($\beta$), are activated and they take part in the catalytic reaction according to the Mars-van-Krevelen mechanism. Furthermore, incorporation of PGM metal into the perovskite structure has been reported to yield an "intelligent catalyst" (PGM migration between bulk and surface at redox conditions), which leads to potential mitigation of metal sintering at severe automotive conditions.

However, the main limitation of using perovskites for emissions abatement emerged from their reduced ability to develop large surface areas (i.e. they have low surface-area-to-volume ratio). Moreover, they drastically sinter above 600° C., sometimes accompanied by phase transition/separation under redox conditions.

SUMMARY OF THE INVENTION

One aspect of the present disclosure is directed to a composition comprising a ceria-zirconia mixed oxide, the ceria-zirconia mixed oxide being surface-modified with a perovskite type compound of formula (I); wherein formula (I) is defined by $A_{x-y}A'_yB_{1-z}B'_zO_3$; where: A is an ion of a metal selected from the group consisting of Li, Na, K, Cs, Mg, Sr, Ba, Ca, Y, La, Ce, Pr, Nd, and Gd; A' is an ion of a metal selected from the group consisting of Li, Na, K, Cs, Mg, Sr, Ba, Ca, Y, La, Ce, Pr, Nd, and Gd; B is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir; B' is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir; x is from 0.7 to 1; y is from 0 to 0.5; and z is from 0 to 0.5.

Another aspect of the present disclosure is directed to a method of manufacturing a composition comprising a ceria-zirconia mixed oxide, the ceria-zirconia mixed oxide being surface-modified with a perovskite type compound of formula (I); wherein formula (I) is defined by $A_{x-y}A'_yB_{1-z}B'_zO_3$; where: A is an ion of a metal selected from the group consisting of Li, Na, K, Cs, Mg, Sr, Ba, Ca, Y, La, Ce, Pr, Nd, and Gd; A' is an ion of a metal selected from the group consisting of Li, Na, K, Cs, Mg, Sr, Ba, Ca, Y, La, Ce, Pr, Nd, and Gd; B is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir; B' is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir; x is from 0.7 to 1; y is from 0 to 0.5; and z is from 0 to 0.5, the method comprising: providing a solution comprising an organic acid, water, one or more salts of A, one or more salts of B and optionally one or more salts of A' and/or one or more salts of B'; contacting the solution with a ceria-zirconia mixed oxide to form a slurry; and heating the slurry.

Another aspect of the present disclosure is directed to a composition obtained or obtainable by the method of the above aspect.

Another aspect of the present disclosure is directed to a method of manufacturing a composition comprising a ceria-zirconia mixed oxide, the ceria-zirconia mixed oxide being surface-modified with a perovskite type compound of formula (I); wherein formula (I) is defined by $A_{x-y}A'_yB_{1-z}B'_zO_3$; where: A is an ion of a metal selected from the group consisting of Li, Na, K, Cs, Mg, Sr, Ba, Ca, Y, La, Ce, Pr, Nd, and Gd; A' is an ion of a metal selected from the group consisting of Li, Na, K, Cs, Mg, Sr, Ba, Ca, Y, La, Ce, Pr, Nd, and Gd; B is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir; B' is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir; x is from 0.7 to 1; y is from 0 to 0.5; and z is from 0 to 0.5, the method comprising: contacting a ceria-zirconia mixed oxide with A, B, and optionally A' and/or B' using one or more salts of A, one or more salts of B and optionally one or more salts of A' and/or one or more salts of B' via incipient wetness impregnation to form an impregnated ceria-zirconia mixed oxide; and heating the impregnated ceria-zirconia mixed oxide.

Another aspect of the present disclosure is directed to a composition obtained or obtainable by the method of the above aspect.

Another aspect of the present disclosure is directed to a method of manufacturing a composition comprising a ceria-zirconia mixed oxide, the ceria-zirconia mixed oxide being surface-modified with a perovskite type compound of formula (I); wherein formula (I) is defined by $A_{x-y}A'_yB_{1-z}B'_zO_3$; where: A is an ion of a metal selected from the group consisting of Li, Na, K, Cs, Mg, Sr, Ba, Ca, Y, La, Ce, Pr, Nd, and Gd; A' is an ion of a metal selected from the group consisting of Li, Na, K, Cs, Mg, Sr, Ba, Ca, Y, La, Ce, Pr, Nd, and Gd; B is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir; B' is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir; x is from 0.7 to 1; y is from 0 to 0.5; and z is from 0 to 0.5, the method comprising: providing a solution comprising one or more salts of A, one or more salts of B and optionally one or more salts of A' and/or one or more salts of B'; contacting the solution with a ceria-zirconia mixed oxide to form a slurry; spray drying the slurry to form a spray-dried powder; and heating the spray-dried powder.

Another aspect of the present disclosure is directed to a composition obtained or obtainable by the method of the above aspect.

Another aspect of the present invention is directed to a method of manufacturing a composition comprising a ceria-zirconia mixed oxide, the ceria-zirconia mixed oxide being surface-modified with a perovskite type compound of formula (I); wherein formula (I) is defined by $A_{x-y}A'_yB_{1-z}B'_zO_3$; where: A is an ion of a metal selected from the group consisting of Li, Na, K, Cs, Mg, Sr, Ba, Ca, Y, La, Ce, Pr, Nd, and Gd; A' is an ion of a metal selected from the group consisting of Li, Na, K, Cs, Mg, Sr, Ba, Ca, Y, La, Ce, Pr, Nd, and Gd; B is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir; B' is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir; x is from 0.7 to 1; y is from 0 to 0.5; and z is from 0 to 0.5, the method comprising: providing an aqueous solution comprising one or more salts of A, one or more salts of B and optionally one or more salts of A' and/or one or more salts of B'; contacting the solution with a ceria-zirconia mixed oxide to form a slurry; contacting the slurry with a base; recovering a solid residue from the slurry; and heating the solid residue.

Another aspect of the present disclosure is directed to a composition obtained or obtainable by the method of the above aspect.

Another aspect of the present disclosure is directed to a catalyst article comprising a substrate, the substrate having a composition of the invention disposed thereon.

The invention also encompasses an emission treatment system comprising the catalyst article described herein and a method of treating an exhaust gas, the method comprising: providing the catalyst article described herein; and contacting the catalyst article with an exhaust gas.

BRIEF DESCRIPTION OF THE DRAWINGS

FIG. 3 shows OSC conventional CZO, (A3) 10% $BaMnO_3$-modified CZO, (A8) 10% $La_{0.9}MnO_3$-modified CZO, (A10) 10% $CaMnO_3$-modified CZO, and (A12) 10% $LaFeO_3$-modified CZO.

FIG. 4a shows perturbated aged TWC light off performance for $NO_x$ conversions of washcoated (B1) Reference Pd catalyst (aged) on single CZO support, and Pd catalysts (aged) on (B2) $BaMnO_3$-type perovskite-modified CZO support.

FIG. 4b shows perturbated aged TWC light off performance for CO conversions of washcoated (B1) Reference Pd catalyst (aged) on single CZO support, and Pd catalysts (aged) on (B2) $BaMnO_3$-type perovskite-modified CZO support.

FIG. 4c shows perturbated aged TWC light off performance for THC conversions of washcoated (B1) Reference Pd catalyst (aged) on single CZO support, and Pd catalysts (aged) on (B2) $BaMnO_3$-type perovskite-modified CZO support.

FIG. 5a shows perturbated aged TWC light off performance for $NO_x$ conversions of washcoated (B3) Reference Rh catalyst (aged) on single CZO support, and Rh catalysts (aged) on (B4) $La_{0.9}MnO_3$-, and (B5) $LaFeO_3$-type perovskite-modified CZO supports.

FIG. 5b shows perturbated aged TWC light off performance for CO conversions of washcoated (B3) Reference Rh catalyst (aged) on single CZO support, and Rh catalysts (aged) on (B4) $La_{0.9}MnO_3$-, and (B5) $LaFeO_3$-type perovskite-modified CZO supports.

FIG. 5c shows perturbated aged TWC light off performance for THC conversions of washcoated (B3) Reference Rh catalyst (aged) on single CZO support, and Rh catalysts (aged) on (B4) $La_{0.9}MnO_3$-, and (B5) $LaFeO_3$-type perovskite-modified CZO supports.

FIG. 6a shows perturbated aged TWC light off performance for $NO_x$ conversions of washcoated (B6) reference Pd fully formulated catalyst (aged), and Pd catalysts (aged) with (B7) 10% $BaMnO_3$-, and (B8) 10% $LaFeO_3$ modified CZO-type perovskite-modified CZO supports.

FIG. 6b shows perturbated aged TWC light off performance for CO conversions of washcoated (B6) reference Pd fully formulated catalyst (aged), and Pd catalysts (aged) with (B7) 10% $BaMnO_3$-, and (B8) 10% $LaFeO_3$ modified CZO-type perovskite-modified CZO supports.

FIG. 6c shows perturbated aged TWC light off performance for THC conversions of washcoated (B6) reference Pd fully formulated catalyst (aged), and Pd catalysts (aged) with (B7) 10% $BaMnO_3$-, and (B8) 10% $LaFeO_3$ modified CZO-type perovskite-modified CZO supports.

FIG. 7a shows perturbated aged TWC light off performance for $NO_x$ conversions of washcoated (B9) reference Pt (aged) fully formulated catalyst, and Pt catalysts (aged) with (B10) 20% $CaMnO_3$-modified CZO support.

FIG. 7b shows perturbated aged TWC light off performance for CO conversions of washcoated (B9) reference Pt (aged) fully formulated catalyst, and Pt catalysts (aged) with (B10) 20% $CaMnO_3$-modified CZO support.

FIG. 7c shows perturbated aged TWC light off performance for THC conversions of washcoated (B9) reference Pt (aged) fully formulated catalyst, and Pt catalysts (aged) with (B10) 20% $CaMnO_3$-modified CZO support.

FIG. 8a shows perturbated aged TWC light off performance for $NO_x$ conversions of washcoated (B11) reference RhPt (aged) fully formulated catalyst, and RhPt catalysts (aged) with (B12) 10% BaMnO$_3$-, (B13) 10% La$_{0.9}$MnO$_3$-, and (B14) 10% CaMnO$_3$-modified CZO supports.

FIG. 8*b* shows perturbated aged TWC light off performance for CO conversions of washcoated (B11) reference RhPt (aged) fully formulated catalyst, and RhPt catalysts (aged) with (B12) 10% BaMnO$_3$-, (B13) 10% La$_{0.9}$MnO$_3$-, and (B14) 10% CaMnO$_3$-modified CZO supports.

FIG. 8*c* shows perturbated aged TWC light off performance for THC conversions of washcoated (B11) reference RhPt (aged) fully formulated catalyst, and RhPt catalysts (aged) with (B12) 10% BaMnO$_3$-, (B13) 10% La$_{0.9}$MnO$_3$-, and (B14) 10% CaMnO$_3$-modified CZO supports.

DETAILED DESCRIPTION OF THE INVENTION

Figure 1:
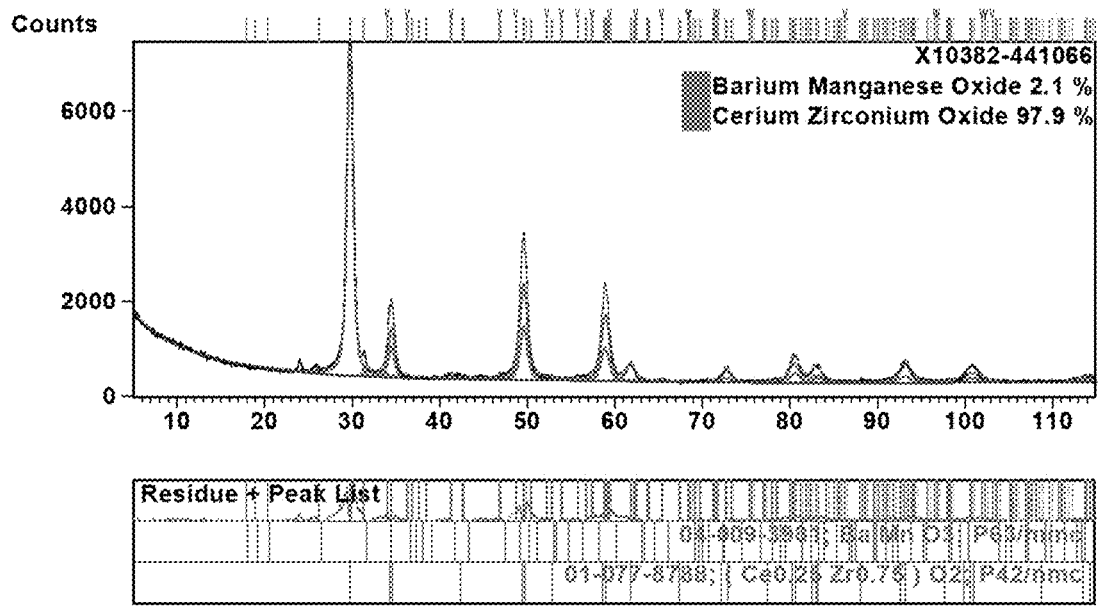
FIG. 1 shows a powder XRD pattern of 10% $BaMnO_3$-modified CZO according to the Example A1.

The present invention seeks to tackle at least some of the problems associated with the prior art or at least to provide a commercially acceptable alternative solution thereto.

In a first aspect, the present invention provides a composition comprising a ceria-zirconia mixed oxide, the ceria-zirconia mixed oxide being surface-modified with a perovskite type compound of formula (I);

wherein formula (I) is defined by $A_{x-y}A'_yB_{1-z}B'_zO_3$; where:

A is an ion of a metal selected from the group consisting of Li, Na, K, Cs, Mg, Sr, Ba, Ca, Y, La, Ce, Pr, Nd, and Gd;

A' is an ion of a metal selected from the group consisting of Li, Na, K, Cs, Mg, Sr, Ba, Ca, Y, La, Ce, Pr, Nd, and Gd;

B is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;

B' is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;

x is from 0.7 to 1;

y is from 0 to 0.5; and z is from 0 to 0.5.

Each aspect or embodiment as defined herein may be combined with any other aspect(s) or embodiment(s) unless clearly indicated to the contrary. In particular, any features indicated as being preferred or advantageous may be combined with any other feature indicated as being preferred or advantageous.

A ceria-zirconia mixed oxide is a typical support material used in emission treatment catalysts, such as TWCs. Ceria-zirconia mixed oxides are known to provide high surface area for active PGM metals and promoter species. The ceria-zirconia mixed oxide may be referred to as "CZO" herein. The relative ratio of Ce:Zr in the mixed oxide is not particularly limited for the purposes of this invention, i.e. it may be from 0 wt. % ceria to 100 wt. % ceria.

Surprisingly, the inventors of the present invention have found that surface-modifying such a ceria-zirconia mixed oxide support with a perovskite-type compound can impart further or enhanced OSC properties to the ceria-zirconia mixed oxide, while still being able to retain most of its surface area at thermal ageing conditions. This may advantageously also facilitate improved promotion of supported PGM species supported on the modified support (the composition of the invention), if present, in order to obtain improved TWC conversions. Ceria-zirconia mixed oxides are promising supports for perovskite type compounds due to their high surface area and inability to enter into the perovskite lattice with any of the most used cations, e.g. La, Ba, Sr, Co, Mn, or Fe.

The term "surface-modified" as used herein may encompass that the perovskite type compound is supported or coated on the ceria-zirconia mixed oxide, for example. That is, the perovskite type compound is physically and/or chemically attached to or supported on the surface of the ceria-zirconia mixed oxide, preferably in a (highly) dispersed form. The term "surface-modified" does not encompass merely a physical blend or mixture of the bulk perovskite type compound and the ceria-zirconia mixed oxide. The perovskite type compound is not in bulk form in this sense. The term "surface-modified" as used herein may also encompass that the perovskite type compound has smaller particle sizes than the ceria-zirconia mixed oxide. The term "surface-modified" as used herein may also encompass that the ceria-zirconia mixed oxide is in bulk form, and the perovskite type compound is dispersed on the surface and/or within the pores of the bulk ceria-zirconia mixed oxide.

Without wishing to be bound by theory, it is thought that providing such a surface-modified ceria-zirconia mixed oxide, in which the ceria-zirconia mixed oxide has been surface-modified with a perovskite type compound of formula (I), the perovskite compound may be stabilised by the ceria-zirconia mixed oxide. Thus, the drawbacks of bulk perovskite type compounds, such as their low surface-area-to-volume ratio and their lack of stability at exhaust gas catalyst operating temperatures, may be mitigated, while imparting their advantageous OSC properties to the ceria-zirconia mixed oxide support. That is, the ceria-zirconia mixed oxide phase may act both as a support to provide high surface area and to stabilize the perovskite nanocrystalline phase (e.g. from sintering) at thermal ageing conditions. Synergistic interactions between the dispersed perovskites and the supporting species (e.g. PGM and promoter) may also occur, which may lead to enhanced TWC performance. Besides the promotional effect, the perovskite itself may also exhibit intrinsic activity for TWC reactions, facilitating the PGM performance, which may allow for potential reduction of PGM loading. There is a desire in the field to reduce the amount of PGM loading, due, inter alia, to costs.

Such advantages may not be realized by the use of bulk-phase perovskite type compounds in catalysts for treating exhaust gas, particularly TWC catalysts.

Thus, advantageously, the composition of the invention may be used in place of existing support materials, such as where ceria-zirconia mixed oxide is used as a support material in a known catalyst article, to provide OSC properties to the catalyst, or even to replace existing OSC support materials, such as ceria-zirconia support materials, which may lead to further and/or improved OSC properties. For example, it has been shown that replacing conventional support materials with the composition of the invention can significantly decrease the T$_{50}$ (the temperature at which 50% conversion is reached) of conversion for NO$_x$, CO and/or THC (total hydrocarbon) abatement.

In summary, the present inventors have surprisingly been able to utilise the OSC benefits of perovskite type compounds for use in emission treatment catalysts, while at least partially mitigating the drawbacks and instability of such compounds in bulk form at the operating temperatures of the catalysts, e.g. TWCs.

The term "perovskite" as used herein takes on its usual meaning in the art, i.e. a perovskite type compound may refer to the class of compounds which have a similar or distorted type of crystal structure to CaTiO$_3$.

The composition and/or perovskite type compound of formula (I) may comprise inevitable impurities, typically less than 1 wt. %, preferably less than 0.5 wt. %, more preferably less than 0.1 wt. %.

Preferably, the composition consists of a ceria-zirconia mixed oxide, the ceria-zirconia mixed oxide being surface-modified with a perovskite type compound of formula (I).

Preferably, A and/or A' is an ion of a metal selected from the group consisting of Ca, Mg, Ba, Ca, Y, La, Sr, Nd, Ce and Gd, more preferably A and/or A' is an ion of a metal selected from the group consisting of Ca, Ba, La and Sr. Preferably, B and/or B' is an ion of a metal selected from the group consisting of Mn, Co, Fe, Zr and Ni, more preferably, B and/or B' is an ion of a metal selected from the group consisting of Mn, Zr, and Fe. Preferably, B and/or B' is doped with PGM elements comprising one or more of Pt, Pd and Rh, i.e. B and/or B' may further comprise, in addition to the preferred metals listed above, an ion of a metal selected from the group consisting of Pt, Pd and Rh. Such compositions may be particularly suitable for use in the applications described herein, for example in a TWC.

Preferably, x is from 0.8 to 1, more preferably from 0.9 to 1 or alternatively, but still preferred, from 0.7 to 0.9, more preferably from 0.8 to 0.9. Preferably, y is from 0 to 0.3, more preferably from 0 to 0.2, more preferably from greater than 0 to 0.2. Preferably, z is from 0 to 0.4, more preferably from 0 to 0.3, still more preferably from greater than 0 to 0.2. Such compositions may be particularly suitable for use in the applications described herein, for example in a TWC.

Preferably, y>0. Preferably, z>0. Such compositions may be particularly suitable for use in the applications described herein, for example in a TWC.

In an alternative preferred embodiment, z is 0. In an alternative preferred embodiment, y is 0. Preferably, y=z=0. However, z can be 0 when y>0 and y can be 0 when z>0.

Preferably, when y=z=0, A is La and B is Mn. In an alternative preferred embodiment, when y=z=0, A is Ca and B is Mn. In an alternative preferred embodiment, when y=z=0, A is La and B is Fe. In an alternative preferred embodiment, when y=z=0, A is Ba and B is Mn. In an alternative preferred embodiment, when y=z=0, A is Sr and B is Mn. In an alternative preferred embodiment, when y=z=0, A is Ba and B is Fe. In an alternative preferred embodiment, when y=z=0, A is Ca and B is Fe. In an alternative preferred embodiment, when y=z=0, A is Sr and B is Fe. Such compositions may be particularly suitable for use in the applications described herein, for example in a TWC.

Preferably, x is 1. Such compositions may be particularly suitable for use in the applications described herein, for example in a TWC.

Preferably, the ceria-zirconia mixed oxide is doped. Suitable dopants are known in the art. For example, preferably, the ceria-zirconia mixed oxide is doped with an oxide of one or more of La, Ba, Sr, Mg, Mn, Y, Nd, Pr, Ti, Fe, Cu, Co, Zn, Si, Al, and Ni, more preferably La, Y, Nd and Pr. Such doped ceria-zirconia mixed oxide may be particularly effective as a support material. Preferably, the dopant is present in the ceria-zirconia mixed oxide in an amount of from 0.001 wt. % to 20 wt. %, and more preferably from 0.5 wt. % to 10 wt. %, based on the total weight of ceria-zirconia mixed oxide.

Preferably, the composition comprises from 1 to 50 wt. % of the perovskite type compound, based on the total weight of the perovskite type compound and the ceria-zirconia mixed oxide, preferably from 5 to 30 wt. %, more preferably from 5 to 25 wt. %, still more preferably from 10 to 20 wt. %. The perovskite type compound may be highly dispersed on the ceria-zirconia mixed oxide, for example. Such a ratio of perovskite type compound may provide a particularly stable composition having improved OSC properties.

Preferably, the ceria-zirconia mixed oxide is further surface-modified with a mixed oxide composite of formula (I). This may occur, for example, when phases other than the perovskite phase of formula (I) are present, such as due to incomplete formation of the perovskite phase during synthesis.

In a further aspect, the present invention provides a method of manufacturing a composition comprising a ceria-zirconia mixed oxide, the ceria-zirconia mixed oxide being surface-modified with a perovskite type compound of formula (I);

wherein formula (I) is defined by $A_{x-y}A'_yB_{1-z}B'_zO_3$;

where:

A is an ion of a metal selected from the group consisting of Li, Na, K, Cs, Mg, Sr, Ba, Ca, Y, La, Ce, Pr, Nd, and Gd;

A' is an ion of a metal selected from the group consisting of Li, Na, K, Cs, Mg, Sr, Ba, Ca, Y, La, Ce, Pr, Nd, and Gd;

B is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;

B' is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;

x is from 0.7 to 1;

y is from 0 to 0.5; and z is from 0 to 0.5, the method comprising:

providing a solution comprising an organic acid, water, one or more salts of A, one or more salts of B and optionally one or more salts of A' and/or one or more salts of B';

contacting the solution with a ceria-zirconia mixed oxide to form a slurry; and heating the slurry.

Such a method may be considered as a (modified) Pechini method.

The term "slurry" as used herein may encompass a liquid comprising insoluble material, e.g. insoluble particles. The slurry is typically stirred, more typically for at least 10 minutes, more typically for at least 30 minutes, even more typically for at least an hour. Increased contacting and/or stirring times may increase the dispersion of the perovskite type compound on the ceria-zirconia mixed oxide.

Contacting the solution with a ceria-zirconia mixed oxide may typically comprise adding ceria-zirconia mixed oxide, for example in powder form, to the solution. However, contacting the solution with a ceria-zirconia mixed oxide may comprise combining the solution with a slurry comprising ceria-zirconia mixed oxide, for example a ceria-zirconia mixed oxide powder in water. The contacting step is not particularly limited in this regard.

In some preferred embodiments, the solution further comprises an organic solvent, preferably ethylene glycol. However, more preferably, the solution does not comprise an inorganic solvent, i.e. the solution is preferably an aqueous solution.

The one or more salts preferably comprise acetate, nitrate, oxynitrate, chloride, ammonium nitrate, hydroxide, oxalate and/or citrate salts, more preferably acetate, nitrate and/or oxynitrate salts.

Preferably, heating the slurry comprises a first step of heating the slurry to a temperature of from 150 to 350° C. to form a gel. The term "gel" as used herein may encompass a colloid in a more solid form than a sol or a thick, viscous slurry, for example. Without wishing to be bound by theory, this relatively low temperature heating may facilitate the evaporation of at least some of the water in the slurry to thicken the slurry and/or the formation of the perovskite type compound on the ceria-zirconia mixed oxide. More preferably, heating the slurry comprises a first step of heating the slurry to a temperature of from 200 to 300° C., such as from 250 to 300° C. to form a gel.

Preferably, heating the slurry comprises calcination, preferably after the heating step described above (i.e. comprising a first step of heating the slurry to a temperature of from 150 to 350° C. to form a gel). The term "calcination" as used herein may encompass a thermal treatment process in the absence of, or limited supply of, air or oxygen to bring about a thermal decomposition or change. However, typically, calcination in the present context involves heating in air in an oven. Preferably, the calcination comprises heating at a temperature of from 300 to 500° C., preferably from 350 to 450° C., for from 1 to 10 hours, preferably from 3 to 6 hours. In an alternative or additional preferred embodiment, the calcination comprises heating at a temperature of from 600 to 1000° C., preferably from 700 to 900° C. for from 1 to 8 hours, preferably from 2 to 5 hours. More preferably, the calcination comprises a first calcination step comprising heating at a temperature of from 300 to 500° C., preferably from 350 to 450° C., for from 1 to 10 hours, preferably from 3 to 6 hours, followed by a second calcination step comprising heating at a temperature of from 600 to 1000° C., preferably from 700 to 900° C., for from 1 to 8 hours, preferably from 2 to 5 hours. Without wishing to be bound by theory, it is thought that the first, lower temperature, calcination step may facilitate the formation of a mixed oxide of the perovskite-precursor metals, i.e. forming a mixed oxide from the precursor salts, and the second, higher temperature, calcination step may then facilitate the formation of a dense perovskite structure supported on the ceria-zirconia mixed oxide (i.e. a surface-modified ceria-zirconia mixed oxide). It is emphasized that the perovskite type compound is not in bulk form, but is supported on the surface of the ceria-zirconia mixed oxide.

Preferably, the organic acid comprises a carboxylic acid, more preferably a di- or tri-carboxylic acid. The organic acid preferably comprises, or even consists of, citric acid, tannic acid, humic acid, succinic acid, EDTA, DTPA and/or other chelating agents, more preferably citric acid, tannic acid, humic acid, succinic acid, EDTA and/or DTPA, even more preferably citric acid.

Preferably, the composition manufactured by the method of this aspect is the composition of the first aspect described herein.

In a further aspect, the present invention provides a composition obtained or obtainable by the method of the above aspect.

Surprisingly, the inventors of the present invention have found that surface-modifying such a ceria-zirconia mixed oxide support with a perovskite-type compound can impart further or enhanced OSC properties to the ceria-zirconia mixed oxide, while still being able to retain most of its surface area at thermal ageing conditions. This may advantageously also facilitate improved promotion of supported PGM species supported on the modified support (the composition of the invention), if present, in order to obtain improved TWC conversions. Ceria-zirconia mixed oxides are promising supports for perovskite type compounds due to their high surface area and inability to enter into the perovskite lattice with any of the most used cations, e.g. La, Ba, Sr, Co, Mn, or Fe.

Without wishing to be bound by theory, it is thought that providing such a surface-modified ceria-zirconia mixed oxide, in which the ceria-zirconia mixed oxide has been surface-modified with a perovskite type compound of formula (I), the perovskite compound may be stabilised by the ceria-zirconia mixed oxide. Thus, the drawbacks of bulk perovskite type compounds, such as their low surface-area-to-volume ratio and their lack of stability at exhaust gas catalyst operating temperatures, may be mitigated, while imparting their advantageous OSC properties to the ceria-zirconia mixed oxide support. That is, the ceria-zirconia mixed oxide phase may act both as a support to provide high surface area and to stabilize the perovskite nanocrystalline phase (e.g. from sintering) at thermal ageing conditions. Synergistic interactions between the dispersed perovskites and the supporting species (e.g. PGM and promoter) may also occur, which may lead to enhanced TWC performance. Besides the promotional effect, the perovskite itself may also exhibit intrinsic activity for TWC reactions, facilitating the PGM performance, which may allow for potential reduction of PGM loading. There is a desire in the field to reduce the amount of PGM loading, due, inter alia, to costs.

Such advantages may not be realized by the use of bulk-phase perovskite type compounds in catalysts for treating exhaust gas, particularly TWC catalysts.

Thus, advantageously, the composition of the invention may be used in place of existing support materials, such as where ceria-zirconia mixed oxide is used as a support material in a known catalyst article, to provide OSC properties to the catalyst, or even to replace existing OSC support materials, such as ceria-zirconia support materials, which may lead to further and/or improved OSC properties. For example, it has been shown that replacing conventional support materials with the composition of the invention can significantly decrease the T50 (the temperature at which 50% conversion is reached) of conversion for $NO_x$, CO and/or THC (total hydrocarbon) abatement.

In summary, the present inventors have surprisingly been able to utilise the OSC benefits of perovskite type compounds for use in emission treatment catalysts, while at least partially mitigating the drawbacks and instability of such compounds in bulk form at the operating temperatures of the catalysts, e.g. TWCs. In other words, the same advantages as for the composition of the first aspect apply to the composition of this aspect.

In a further aspect, the present invention provides a method of manufacturing a composition comprising a ceria-zirconia mixed oxide, the ceria-zirconia mixed oxide being surface-modified with a perovskite type compound of formula (I);

wherein formula (I) is defined by $A_{x-y}A'_yB_{1-z}B'_zO_3$;
where:
A is an ion of a metal selected from the group consisting of Li, Na, K, Cs, Mg, Sr, Ba, Ca, Y, La, Ce, Pr, Nd, and Gd;
A' is an ion of a metal selected from the group consisting of Li, Na, K, Cs, Mg, Sr, Ba, Ca, Y, La, Ce, Pr, Nd, and Gd;
B is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;
B' is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;

x is from 0.7 to 1;
y is from 0 to 0.5; and
z is from 0 to 0.5, the method comprising:
contacting a ceria-zirconia mixed oxide with A, B, and optionally A' and/or B' using one or more salts of A, one or more salts of B and optionally one or more salts of A' and/or one or more salts of B' via incipient wetness impregnation to form an impregnated ceria-zirconia mixed oxide; and
heating the impregnated ceria-zirconia mixed oxide.

Incipient wetness impregnation (IW or IWI) is a well-known technique in the field. The skilled person would be able to perform an appropriate incipient wetness impregnation method without further direction.

Contacting a ceria-zirconia mixed oxide with A, B, and optionally A' and/or B' using one or more salts of A, one or more salts of B and optionally one or more salts of A' and/or one or more salts of B' via incipient wetness impregnation may comprise impregnating a ceria-zirconia mixed oxide with A, B, and optionally A' and/or B' using one or more salts of A, one or more salts of B and optionally one or more salts of A' and/or one or more salts of B' via incipient wetness impregnation, for example.

The one or more salts preferably comprise acetate, nitrate, oxynitrate, chloride, ammonium nitrate, hydroxide, oxalate and/or citrate salts, more preferably acetate, nitrate and/or oxynitrate salts.

Preferably, heating the impregnated ceria-zirconia mixed oxide comprises a first step of drying the impregnated ceria-zirconia mixed oxide at a temperature of from 50 to 150° C., preferably from 50 to 100° C. for from 1 hour to 24 hours, preferably 6 hours to 12 hours.

Preferably, heating the impregnated ceria-zirconia mixed oxide comprises calcination, preferably after the heating step described above (i.e. comprising a first step of drying the impregnated ceria-zirconia mixed oxide at a temperature of from 50 to 150° C., preferably from 50 to 100° C. for from 1 hour to 24 hours, preferably 6 hours to 12 hours). Preferably, the calcination comprises heating at a temperature of from 300 to 500° C., preferably from 350 to 450° C., for from 1 to 10 hours, preferably from 3 to 6 hours. In an alternative or additional preferred embodiment, the calcination comprises heating at a temperature of from 600 to 1000° C., preferably from 700 to 900° C. for from 1 to 8 hours, preferably from 2 to 5 hours. More preferably, the calcination comprises a first calcination step comprising heating at a temperature of from 300 to 500° C., preferably from 350 to 450° C., for from 1 to 10 hours, preferably from 3 to 6 hours, followed by a second calcination step comprising heating at a temperature of from 600 to 1000° C., preferably from 700 to 900° C., for from 1 to 8 hours, preferably from 2 to 5 hours. Without wishing to be bound by theory, it is thought that the first, lower temperature, calcination step may facilitate the formation of a mixed oxide of the perovskite-precursor metals, i.e. forming a mixed oxide from the precursor salts, and the second, higher temperature, calcination step may then facilitate the formation of a dense perovskite structure supported on the ceria-zirconia mixed oxide (i.e. a surface-modified ceria-zirconia mixed oxide). It is emphasized that the perovskite type compound is not in bulk form, but may be supported on the surface of the ceria-zirconia mixed oxide in a dispersed state.

Preferably, the composition manufactured by the method of this aspect is the composition of the first aspect described herein.

In a further aspect, the present invention provides a composition obtained or obtainable by the method of the above aspect.

Surprisingly, the inventors of the present invention have found that surface-modifying such a ceria-zirconia mixed oxide support with a perovskite-type compound can impart further or enhanced OSC properties to the ceria-zirconia mixed oxide, while still being able to retain most of its surface area at thermal ageing conditions. This may advantageously also facilitate improved promotion of supported PGM species supported on the modified support (the composition of the invention), if present, in order to obtain improved TWC conversions. Ceria-zirconia mixed oxides are promising supports for perovskite type compounds due to their high surface area and inability to enter into the perovskite lattice with any of the most used cations, e.g. La, Ba, Sr, Co, Mn, or Fe.

Without wishing to be bound by theory, it is thought that providing such a surface-modified ceria-zirconia mixed oxide, in which the ceria-zirconia mixed oxide has been surface-modified with a perovskite type compound of formula (I), the perovskite compound may be stabilised by the ceria-zirconia mixed oxide. Thus, the drawbacks of bulk perovskite type compounds, such as their low surface-area-to-volume ratio and their lack of stability at exhaust gas catalyst operating temperatures, may be mitigated, while imparting their advantageous OSC properties to the ceria-zirconia mixed oxide support. That is, the ceria-zirconia mixed oxide phase may act both as a support to provide high surface area and to stabilize the perovskite nanocrystalline phase (e.g. from sintering) at thermal ageing conditions. Synergistic interactions between the dispersed perovskites and the supporting species (e.g. PGM and promoter) may also occur, which may lead to enhanced TWC performance. Besides the promotional effect, the perovskite itself may also exhibit intrinsic activity for TWC reactions, facilitating the PGM performance, which may allow for potential reduction of PGM loading. There is a desire in the field to reduce the amount of PGM loading, due, inter alia, to costs.

Such advantages may not be realized by the use of bulk-phase perovskite type compounds in catalysts for treating exhaust gas, particularly TWC catalysts.

Thus, advantageously, the composition of the invention may be used in place of existing support materials, such as where ceria-zirconia mixed oxide is used as a support material in a known catalyst article, to provide OSC properties to the catalyst, or even to replace existing OSC support materials, such as ceria-zirconia support materials, which may lead to further and/or improved OSC properties. For example, it has been shown that replacing conventional support materials with the composition of the invention can significantly decrease the T50 (the temperature at which 50% conversion is reached) of conversion for $NO_x$, CO and/or THC (total hydrocarbon) abatement.

In summary, the present inventors have surprisingly been able to utilise the OSC benefits of perovskite type compounds for use in emission treatment catalysts, while at least partially mitigating the drawbacks and instability of such compounds in bulk form at the operating temperatures of the catalysts, e.g. TWCs. In other words, the same advantages as for the composition of the first aspect apply to the composition of this aspect.

In a further aspect, the present invention provides a method of manufacturing a composition comprising a ceria-zirconia mixed oxide, the ceria-zirconia mixed oxide being surface-modified with a perovskite type compound of formula (I);

wherein formula (I) is defined by $A_{x-y}A'_yB_{1-z}B'_zO_3$;
where:
A is an ion of a metal selected from the group consisting of Li, Na, K, Cs, Mg, Sr, Ba, Ca, Y, La, Ce, Pr, Nd, and Gd;
A' is an ion of a metal selected from the group consisting of Li, Na, K, Cs, Mg, Sr, Ba, Ca, Y, La, Ce, Pr, Nd, and Gd;
B is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;
B' is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;
x is from 0.7 to 1;
y is from 0 to 0.5; and
z is from 0 to 0.5, the method comprising:
providing a solution comprising one or more salts of A, one or more salts of B and optionally one or more salts of A' and/or one or more salts of B';
contacting the solution with a ceria-zirconia mixed oxide to form a slurry;
spray drying the slurry to form a spray-dried powder; and
heating the spray-dried powder.

Spray drying is a well-known technique in the field. The skilled person would be able to perform an appropriate spray drying method without further direction.

Contacting the solution with a ceria-zirconia mixed oxide may typically comprise adding ceria-zirconia mixed oxide, for example in powder form, to the solution. However, contacting the solution with a ceria-zirconia mixed oxide may comprise combining the solution with a slurry comprising ceria-zirconia mixed oxide, for example ceria-zirconia mixed oxide powder in water. The contacting step is not particularly limited in this regard.

The one or more salts preferably comprise acetate, nitrate, oxynitrate, chloride, ammonium nitrate, hydroxide, oxalate and/or citrate salts, more preferably acetate, nitrate and/or oxynitrate salts.

Preferably, the solution is an aqueous solution.

Preferably, heating the spray-dried powder comprises calcination. Preferably, the calcination comprises heating at a temperature of from 300 to 500° C., preferably from 350 to 450° C., for from 1 to 10 hours, preferably from 3 to 6 hours. In an alternative or additional preferred embodiment, the calcination comprises heating at a temperature of from 600 to 1000° C., preferably from 700 to 900° C. for from 1 to 8 hours, preferably from 2 to 5 hours. More preferably, the calcination comprises a first calcination step comprising heating at a temperature of from 300 to 500° C., preferably from 350 to 450° C., for from 1 to 10 hours, preferably from 3 to 6 hours, followed by a second calcination step comprising heating at a temperature of from 600 to 1000° C., preferably from 700 to 900° C., for from 1 to 8 hours, preferably from 2 to 5 hours. Without wishing to be bound by theory, it is thought that the first, lower temperature, calcination step may facilitate the formation of a mixed oxide of the perovskite-precursor metals, i.e. forming a mixed oxide from the precursor salts, and the second, higher temperature, calcination step may then facilitate the formation of a dense perovskite structure supported on the ceria-zirconia mixed oxide (i.e. a surface-modified ceria-zirconia mixed oxide). It is emphasized that the perovskite type compound is not in bulk form, but is supported on the surface of the ceria-zirconia mixed oxide.

Preferably, the inlet temperature of the spray drying is from 100 to 300° C., more preferably from 150 to 250° C. The inlet temperature is a well-known term within the field of spray drying.

Preferably, the composition manufactured by the method of this aspect is the composition of the first aspect described herein.

In a further aspect, the present invention provides a composition obtained or obtainable by the method of the above aspect.

Surprisingly, the inventors of the present invention have found that surface-modifying such a ceria-zirconia mixed oxide support with a perovskite-type compound can impart further or enhanced OSC properties to the ceria-zirconia mixed oxide, while still being able to retain most of its surface area at thermal ageing conditions. This may advantageously also facilitate improved promotion of supported PGM species supported on the modified support (the composition of the invention), if present, in order to obtain improved TWC conversions. Ceria-zirconia mixed oxides are promising supports for perovskite type compounds due to their high surface area and inability to enter into the perovskite lattice with any of the most used cations, e.g. La, Ba, Sr, Co, Mn, or Fe.

Without wishing to be bound by theory, it is thought that providing such a surface-modified ceria-zirconia mixed oxide, in which the ceria-zirconia mixed oxide has been surface-modified with a perovskite type compound of formula (I), the perovskite compound may be stabilised by the ceria-zirconia mixed oxide. Thus, the drawbacks of bulk perovskite type compounds, such as their low surface-area-to-volume ratio and their lack of stability at exhaust gas catalyst operating temperatures, may be mitigated, while imparting their advantageous OSC properties to the ceria-zirconia mixed oxide support. That is, the ceria-zirconia mixed oxide phase may act both as a support to provide high surface area and to stabilize the perovskite nanocrystalline phase (e.g. from sintering) at thermal ageing conditions. Synergistic interactions between the dispersed perovskites and the supporting species (e.g. PGM and promoter) may also occur, which may lead to enhanced TWC performance. Besides the promotional effect, the perovskite itself may also exhibit intrinsic activity for TWC reactions, facilitating the PGM performance, which may allow for potential reduction of PGM loading. There is a desire in the field to reduce the amount of PGM loading, due, inter alia, to costs.

Such advantages may not be realized by the use of bulk-phase perovskite type compounds in catalysts for treating exhaust gas, particularly TWC catalysts.

Thus, advantageously, the composition of the invention may be used in place of existing support materials, such as where ceria-zirconia mixed oxide is used as a support material in a known catalyst article, to provide OSC properties to the catalyst, or even to replace existing OSC support materials, such as ceria-zirconia support materials, which may lead to further and/or improved OSC properties. For example, it has been shown that replacing conventional support materials with the composition of the invention can significantly decrease the $T_{50}$ (the temperature at which 50% conversion is reached) of conversion for $NO_x$, CO and/or THC (total hydrocarbon) abatement.

In summary, the present inventors have surprisingly been able to utilise the OSC benefits of perovskite type compounds for use in emission treatment catalysts, while at least partially mitigating the drawbacks and instability of such compounds in bulk form at the operating temperatures of the catalysts, e.g. TWCs. In other words, the same advantages as for the composition of the first aspect apply to the composition of this aspect.

In a further aspect, the present invention provides a method of manufacturing a composition comprising a ceria-zirconia mixed oxide, the ceria-zirconia mixed oxide being surface-modified with a perovskite type compound of formula (I);
wherein formula (I) is defined by $A_{x-y}A'_{y}B_{1-z}B'_{z}O_{3}$;
where:
A is an ion of a metal selected from the group consisting of Li, Na, K, Cs, Mg, Sr, Ba, Ca, Y, La, Ce, Pr, Nd, and Gd;
A' is an ion of a metal selected from the group consisting of Li, Na, K, Cs, Mg, Sr, Ba, Ca, Y, La, Ce, Pr, Nd, and Gd;
B is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;
B' is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;
x is from 0.7 to 1;
y is from 0 to 0.5; and
z is from 0 to 0.5, the method comprising:
providing an aqueous solution comprising one or more salts of A, one or more salts of B and optionally one or more salts of A' and/or one or more salts of B';
contacting the solution with a ceria-zirconia mixed oxide to form a slurry;
contacting the slurry with a base;
recovering a solid residue from the slurry; and
heating the solid residue.

Contacting the solution with a ceria-zirconia mixed oxide may typically comprise adding ceria-zirconia mixed oxide, for example in powder form, to the solution. However, contacting the solution with a ceria-zirconia mixed oxide may comprise combining the solution with a slurry comprising a ceria-zirconia mixed oxide, for example ceria-zirconia mixed oxide powder in water. The contacting step is not particularly limited in this regard.

The one or more salts preferably comprise acetate, nitrate, oxynitrate, chloride, ammonium nitrate, hydroxide, oxalate and/or citrate salts, more preferably acetate, nitrate and/or oxynitrate salts.

The method comprises contacting the slurry with a base. Preferably, contacting the slurry with a base comprises contacting the slurry with a solution comprising the base, preferably an aqueous solution comprising the base. Such a method may be referred to as a "co-precipitation" method. Without wishing to be bound by theory, it is thought that the addition of the base may result in precipitation of the A, A', B and/or B' cations on the ceria-zirconia mixed oxide support. The method may further comprise filtering and/or washing the ceria-zirconia mixed oxide after addition of the base (i.e. with the precipitated content thereon) and prior to heating the solid residue.

Recovering a solid residue from the slurry may encompass filtering the slurry to obtain a solid residue. The term "solid residue" as used herein may encompass a filter cake, for example. Such a filter cake is well known in the art.

Preferably, heating the solid residue comprises a first step of drying the solid residue at a temperature of from 50 to 150° C., preferably from 50 to 100° C. for from 1 hour to 24 hours, preferably 6 hours to 12 hours.

Preferably, heating the solid residue comprises calcination, preferably after the heating step described above (i.e. comprising a first step of drying the solid residue at a temperature of from 50 to 150° C., preferably from 50 to 100° C. for from 1 hour to 24 hours, preferably 6 hours to 12 hours). Preferably, the calcination comprises heating at a temperature of from 300 to 500° C., preferably from 350 to 450° C., for from 1 to 10 hours, preferably from 3 to 6 hours. In an alternative or additional preferred embodiment, the calcination comprises heating at a temperature of from 600 to 1000° C., preferably from 700 to 900° C. for from 1 to 8 hours, preferably from 2 to 5 hours. More preferably, the calcination comprises a first calcination step comprising heating at a temperature of from 300 to 500° C., preferably from 350 to 450° C., for from 1 to 10 hours, preferably from 3 to 6 hours, followed by a second calcination step comprising heating at a temperature of from 600 to 1000° C., preferably from 700 to 900° C., for from 1 to 8 hours, preferably from 2 to 5 hours. Without wishing to be bound by theory, it is thought that the first, lower temperature, calcination step may facilitate the formation of a mixed oxide of the perovskite-precursor metals, i.e. forming a mixed oxide from the precursor salts, and the second, higher temperature, calcination step may then facilitate the formation of a dense perovskite structure supported on the ceria-zirconia mixed oxide (i.e. a surface-modified ceria-zirconia mixed oxide). It is emphasized that the perovskite type compound is not in bulk form, but may be supported on the surface of the ceria-zirconia mixed oxide in a dispersed state.

Preferably, the base comprises ammonium hydroxide.

Preferably, recovering a solid residue from the slurry comprises filtering the slurry to obtain a solid residue and washing the solid residue with water, preferably excess water.

Preferably, the composition manufactured by the method of this aspect is the composition of the first aspect described herein.

In a further aspect, the present invention provides a composition obtained or obtainable by the method of the above aspect.

Surprisingly, the inventors of the present invention have found that surface-modifying such a ceria-zirconia mixed oxide support with a perovskite-type compound can impart further or enhanced OSC properties to the ceria-zirconia mixed oxide, while still being able to retain most of its surface area at thermal ageing conditions. This may advantageously also facilitate improved promotion of supported PGM species supported on the modified support (the composition of the invention), if present, in order to obtain improved TWC conversions. Ceria-zirconia mixed oxides are promising supports for perovskite type compounds due to their high surface area and inability to enter into the perovskite lattice with any of the most used cations, e.g. La, Ba, Sr, Co, Mn, or Fe.

Without wishing to be bound by theory, it is thought that providing such a surface-modified ceria-zirconia mixed oxide, in which the ceria-zirconia mixed oxide has been surface-modified with a perovskite type compound of formula (I), the perovskite compound may be stabilised by the ceria-zirconia mixed oxide. Thus, the drawbacks of bulk perovskite type compounds, such as their low surface-area-to-volume ratio and their lack of stability at exhaust gas catalyst operating temperatures, may be mitigated, while imparting their advantageous OSC properties to the ceria-zirconia mixed oxide support. That is, the ceria-zirconia mixed oxide phase may act both as a support to provide high surface area and to stabilize the perovskite nanocrystalline phase (e.g. from sintering) at thermal ageing conditions.

Synergistic interactions between the dispersed perovskites and the supporting species (e.g. PGM and promoter) may also occur, which may lead to enhanced TWC performance. Besides the promotional effect, the perovskite itself may also exhibit intrinsic activity for TWC reactions, facilitating the PGM performance, which may allow for potential reduction of PGM loading. There is a desire in the field to reduce the amount of PGM loading, due, inter alia, to costs.

Such advantages may not be realized by the use of bulk-phase perovskite type compounds in catalysts for treating exhaust gas, particularly TWC catalysts.

Thus, advantageously, the composition of the invention may be used in place of existing support materials, such as where ceria-zirconia mixed oxide is used as a support material in a known catalyst article, to provide OSC properties to the catalyst, or even to replace existing OSC support materials, such as ceria-zirconia support materials, which may lead to further and/or improved OSC properties. For example, it has been shown that replacing conventional support materials with the composition of the invention can significantly decrease the T50 (the temperature at which 50% conversion is reached) of conversion for $NO_x$, CO and/or THC (total hydrocarbon) abatement.

In summary, the present inventors have surprisingly been able to utilise the OSC benefits of perovskite type compounds for use in emission treatment catalysts, while at least partially mitigating the drawbacks and instability of such compounds in bulk form at the operating temperatures of the catalysts, e.g. TWCs. In other words, the same advantages as for the composition of the first aspect apply to the composition of this aspect.

In a further aspect, the present invention provides a catalyst article comprising a substrate, the substrate having the composition described herein disposed thereon.

The term "catalyst article" used herein may encompass an article in which a catalyst is supported thereon or therein. The article may take the form of, for example, a honeycomb monolith, or a filter, e.g. a wall flow filter or a flow-through filter.

The term "substrate" as used herein may encompass, for example, a ceramic or metallic honeycomb, or a filter block, e.g. a wall flow filter or flow-through filter. The substrate may comprise a ceramic monolithic substrate. The substrate may vary in its material composition, size and configuration, cell shape and density, and wall thickness. Suitable substrates are known in the art.

The term "disposed thereon" in the context of this aspect may encompass both having the composition directly disposed on the substrate, i.e. with no intervening material, and/or indirectly disposed on the substrate, i.e. with intervening material. If the substrate is porous, then the term "disposed thereon" may also encompass having the composition disposed therein, for example within the pores of the substrate, i.e. wherein the composition is disposed thereon and/or therein. In other words, the composition described herein may be incorporated into one or more washcoat regions, zones or layers disposed in any order on the substrate. Such substrate-washcoat formulations, in general, are well-known in the field. The term "washcoat" as used herein is well-known in the field and refers to an adherent coating that is applied to a substrate usually during the production of a catalyst.

Preferably, the catalyst article is for treating exhaust gas. Preferably, the catalyst article comprises a three-way catalyst (TWC), more preferably the catalyst article is a TWC.

Preferably, a platinum group metal (PGM) is supported on the composition. The PGM may be supported on the surface and/or within the pores of the ceria-zirconia mixed oxide. The PGM may also be supported on the perovskite type compound. In addition, the PGM may be located at a boundary between the ceria-zirconia mixed oxide and the perovskite type compound supported thereon. Without wishing to be bound by theory, it is thought that the presence of the perovskite type compound may further promote the catalytic activity of the PGM as well as increasing the resistance of the PGM nanoparticles to sintering. PGM sintering may lower the catalytic activity of the PGM. These advantages may be facilitated by charge and/or oxygen transfer between the perovskite phase and the PGM phase, leading to enhanced PGM stability. For example, if the supported PGM particles have a small particle size, then it is thought that in an extreme case the particles may interact/adsorb the PGM into/onto the perovskite framework under oxidising conditions, which may reduce the likelihood of PGM sintering. The perovskite may at least facilitate the formation of a PGM oxide. The term PGM as used herein encompasses one or more platinum group metals selected from ruthenium, rhodium, palladium, osmium, iridium, and platinum. Preferably, the PGM comprises Pt, Pd, Rh, or a mixture or alloy thereof. Such metals may be particularly suitable for carrying out three-way catalysis. The PGM may be in the form of an alloy.

Preferably, the catalyst article is for use in an emission treatment system. Preferably, the catalyst article is for three-way catalysis.

Preferably, the catalyst article has a washcoat loading of from 1 $g/in^3$ to 3 $g/in^3$.

Preferably, the substrate comprises a wall flow filter substrate. In an alternative preferred embodiment, the substrate comprises a flow-through substrate.

Preferably, the catalyst article comprises a bottom layer of support material having rhodium thereon and a top layer of support material having palladium thereon. In an alternative preferred embodiment, the catalyst article comprises a bottom layer of support material having palladium thereon and a top layer of support material having rhodium thereon. The support material may comprise any suitable known support material. However, preferably, the support material comprises the composition described herein. That is, the support material present in the bottom layer and/or the top layer may comprise the composition described herein.

When present, the catalyst article preferably comprises from 2 $g/ft^3$ to 15 $g/ft^3$ rhodium, more preferably from 3 $g/ft^3$ to 10 $g/ft^3$ rhodium. When present, the catalyst article preferably comprises from 20 $g/ft^3$ to 200 $g/ft^3$ palladium, more preferably from 30 $g/ft^3$ to 150 $g/ft^3$ palladium. When present, the catalyst article preferably comprises from 2 $g/ft^3$ to 200 $g/ft^3$ platinum, preferably from 10 $g/ft^3$ to 100 $g/ft^3$ platinum.

In a further aspect, the present invention provides an emission treatment system comprising the catalyst article described herein. Preferably, the emission treatment system is for a gasoline engine. Preferably, the gasoline engine operates under stoichiometric conditions.

In a further aspect, the present invention provides a method of treating an exhaust gas, the method comprising: providing the catalyst article described herein; and contacting the catalyst article with an exhaust gas. Preferably, the exhaust gas is from a gasoline engine. Preferably, the gasoline engine operates under stoichiometric conditions.

The invention will now be described in relation to the following non-limiting examples.

A. Synthesis Examples

Example A1: Synthesis of 10 wt % BaMnO$_3$ Modified CZO by Pechini Method

1. In a 1000 mL beaker, dissolved was a calculated amount of citric acid and ethylene glycol, with molar ratio of n($M_{total}$):n(Citric Acid):n(Ethylene Glycol)=2:3:90, where $M_{total}$ is the total metal cations (Ba and Mn) in the perovskite formula.
2. Added was an appropriate amount of DI water, followed by continuous stirring to form a clear solution.
3. Added were calculated amounts of Barium Acetate (20 g) and Manganese Acetate Tetrahydrate (20 g). This was continuously stirred for 1 hr.
4. Added was the required amount of CZO powder (192 g). This was continuously stirred to mix for 1 hr.
5. The resulting slurry was slowly heated to 275° C. and continuously stirred until a gel was formed.
6. After the gel was cooled to room temperature, it was transferred to a big crucible, and covered with alumina foil (with holes on the cover).
7. Low-temperature calcination was performed in stagnant air at 400° C. for 4 hrs (ramp rate 10° C./min).
8. After the sample was cooled, it was transferred to a smaller crucible and high temperature calcination was performed at 800° C. for 4 hrs (ramp rate 10° C./min).

Example A2: Synthesis of 10 wt % BaMnO$_3$ Modified CZO by Aqueous Method

1. In a 1000 mL beaker, dissolved was a calculated amount of citric acid in 500 mL DI water, with molar ratio of n($M_{total}$):n(Citric Acid)=2:3, where $M_{total}$ is the total metal cations (Ba and Mn) in perovskite formula. This was continuously stirred until a dense slurry was formed.
2. Added were calculated amounts of Barium Acetate (20 g) and Manganese Acetate Tetrahydrate (20 g). This was continuously stirred for 1 hr.
3. Added was the required amount of CZO powder (192 g). This was continuously stirred to mix for 1 hr.
4. The resulting slurry was heated to 275° C. and continuously stirred until a gel was formed.
5. After the gel was cooled to room temperature, it was transferred to a big crucible, and covered with alumina foil (with holes on the cover).
6. Low-temperature calcination was performed in stagnant air at 400° C. for 4 hrs (ramp rate 10° C./min).
7. After the sample was cooled, it was transferred to a smaller crucible and high temperature calcination was performed at 800° C. for 4 hrs (ramp rate 10° C./min).

Example A3: Synthesis of 10 wt % BaMnO$_3$ Modified CZO by Incipient Wetness Impregnation Method 1. 10 wt % equivalent BaMn (1:1 molar ratio) was impregnated with a Barium Acetate (20 g) and Manganese Acetate Tetrahydrate (20 g) mixed solution on CZO powder (192 g) using incipient wetness impregnation.
2. The resulting impregnated CZO was dried at 80° C. for 1 hr, and mixed periodically to prevent wicking.
3. Low-temperature calcination was performed in stagnant air at 400° C. for 4 hrs, followed by high temperature calcination at 800° C. for 4 hrs (ramp rate 10° C./min).

Example A4: Synthesis of 10 wt % BaMnO$_3$ Modified CZO by Spray Drying Method 1. A solution of Barium Acetate (107 g) and Manganese Acetate Tetrahydrate (103 g) was prepared and mixed for 1 hour until the Ba/Mn precursors were fully dissolved.
2. CZO powder (1009 g) was added to the above solution, target solid content of 30%, with mechanical mixing for at least 1 hr to make a slurry.
3. The slurry was spray dried while ensuring sufficient mixing of the slurry during the whole spray drying process.
4. The spray dried powder was collected and calcined in a static oven at 400° C./4 h, followed by 800° C./4 h.

Examples A5-A13

Synthesis procedures for Example A5-A13 were similar to Examples A1-A4, with the main precursor amounts summarized in the following Table 1.

TABLE 1

Main precursor amounts for Example A5-A13.

| Ex. | Target composition (wt. %) on CZO | Synthesis method | Metal precursor A (g) | Metal precursor B (g) | Metal precursor C (g) | CZO support (g) |
|---|---|---|---|---|---|---|
| A5 | 20% BaMnO$_3$ | IWI [III] | BaAcet [a] (38 g) | MnAcet [b] (37 g) | — | 180 |
| A6 | 10% La$_{0.9}$MnO$_3$ | Pechini [I] | LaN [c] (35 g) | MnAcet [b] (22 g) | — | 203 |
| A7 | 10% La$_{0.9}$MnO$_3$ | Aqueous [II] | LaN [c] (35 g) | MnAcet [b] (22 g) | — | 203 |
| A8 | 10% La$_{0.9}$MnO$_3$ | IWI [III] | LaN [c] (35 g) | MnAcet [b] (22 g) | — | 203 |
| A9 | 10% La$_{0.9}$MnO$_3$ | SD [IV] | LaN [c] (173 g) | MnAcet [b] (109 g) | — | 1013 |
| A10 | 10% CaMnO$_3$ | IWI [III] | CaN [d] (50 g) | MnAcet [b] (52 g) | — | 300 |
| A11 | 20% CaMnO$_3$ | IWI [III] | CaN [d] (99 g) | MnAcet [b] (103 g) | — | 300 |

TABLE 1-continued

Main precursor amounts for Example A5-A13.

| Ex. | Target composition (wt. %) on CZO | Synthesis method | Metal precursor A (g) | Metal precursor B (g) | Metal precursor C (g) | CZO support (g) |
|---|---|---|---|---|---|---|
| A12 | 10% LaFeO$_3$ | IWI $^{III}$ | LaN $^c$ (35 g) | FeN $^e$ (32 g) | — | 194 |
| A13 | 20% LaFeO$_3$ | IWI $^{III}$ | LaN $^c$ (74 g) | FeN $^e$ (69 g) | — | 206 |

Notes:
[I] Synthesis procedure similar to Example A1 (Pechini method), with different amounts of metal precursors and CZO
[II] Synthesis procedure similar to Example A2 (Aqueous method), with different amounts of metal precursors and CZO.
[III] Synthesis procedure similar to Example A3 (Incipient wetness impregnation method, IWI), with different amounts of metal precursors and CZO.
[IV] Synthesis procedure similar to Example A4 (Spray drying method, SD), with different amounts of metal precursors and CZO.
$^a$ Barium acetate.
$^b$ Manganese Acetate tetrahydrate.
$^c$ Lanthanum nitrate hexahydrate.
$^d$ Calcium nitrate tetrahydrate.
$^e$ Iron nitrate nonahydrate.

B. Catalyst Preparation Examples

Reference Example B1: 3 wt % Pd/CZO Washcoated Catalyst 1. 3 wt % Pd (as palladium nitrate solution) was impregnated on CZO powder using incipient wetness impregnation.
2. The impregnated CZO was dried at 80° C. for 1 hr, and mixed periodically to prevent wicking, before calcining at 500° C. for 30 min in static air.
3. A slurry was prepared with DI water, and appropriate amount of binder and thickening agent for a final batch solid of 22%. The slurry was mixed vigorously with VWR vortex mixer until homogeneous.
4. 1×3 inch ceramic substrate cores were coated targeting 1.2 inch dose from the inlet end, then dried with air cure.
5. The brick was fired at 500° C. for 30 min in a static oven.

Example B2: 3 wt % Pd/10% BMO Modified CZO Washcoated Catalyst 1. 3 wt % Pd (as palladium nitrate solution) was impregnated on 10% BaMnO$_3$ modified CZO powder (Example A1) using incipient wetness impregnation.
2. The impregnated CZO was dried at 80° C. for 1 hr, and mixed periodically to prevent wicking, before calcining at 500° C. for 30 min in static air
3. A slurry was prepared with DI water, and appropriate amount of binder and thickening agent for a final batch solid of 22%. The slurry was mixed vigorously with VWR vortex mixer till homogeneous.
4. 1×3 inch ceramic substrate cores were coated targeting 1.2 inch dose from the inlet end, then dried with air cure.
5. The brick was fired at 500° C. for 30 min in a static oven.

Examples B3-B5

Catalyst preparation procedures for Examples B3-B5 were similar to Example B1 and B2, with the main precursor amounts summarized in the following Table 2.

TABLE 2

Main precursor amount for Example B3-B5

| Example | PGM and loading wt % | Support material (modified CZO) |
|---|---|---|
| B3 (reference) | 0.3% Rh | Stabilized alumina |
| B4 | 0.3% Rh | (A8) 10% La$_{0.9}$MnO$_3$ modified CZO |
| B5 | 0.3% Rh | (A12) 10% LaFeO$_3$ modified CZO |

Reference Example B6: Fully Formulated Single Layer Pd Washcoat

1. A solution was prepared with the required amount of Pd nitrate (with Pd loading 100 g/ft$^3$).
2. Added were 1 g/in$^3$ of stabilized alumina powder, and 1 g/in$^3$ of CZO material, before mixing for 1 hr.
3. Added was 300 g/ft$^3$ of Barium sulfate, before mixing for at least 1 hr.
4. Added was an appropriate amount of binder before mixing for 1 hr.
5. Solids were adjusted to 30%, thickening agent was added and before mixing overnight.
6. 50-55% from the inlet end of a 1×3 inch ceramic substrate core was coated, dried with air cure, then coated 50-55% dose length from the outlet end.
7. The brick was fired at 500° C. for 30 min in a static oven.

Example B7: Fully Formulated Single Layer Pd Washcoat with 10% BMO Modified CZO

1. A solution was prepared with the required amount of Pd nitrate (with Pd loading 100 g/ft$^3$).
2. Added was 1 g/in$^3$ of stabilized alumina powder, and 1 g/in$^3$ of 10% BaMnO$_3$ modified CZO material (Example A3), before mixing for 1 hr.
3. Added was 300 g/ft$^3$ of Barium sulfate, before mixing for at least 1 hr.
4. Added was an appropriate amount of binder before mixing for 1 hr.
5. Solids were adjusted to 30%, thickening agent was added and before mixing overnight.
6. 50-55% from the inlet end of a 1×3 inch ceramic substrate core was coated, dried with air cure, then coated 50-55% dose length from the outlet end.
7. The brick was fired at 500° C. for 30 min in a static oven.

Example B8: Fully Formulated Single Layer Pd Washcoat with 10% LFO Modified CZO

1. A solution was prepared with the required amount of Pd nitrate (with Pd loading 100 g/ft$^3$).
2. Added was 1 g/in$^3$ of stabilized alumina powder, and 1 g/in$^3$ of 10% LaFeO$_3$ modified CZO material (Example A12), before mixing for 1 hr.
3. Added was 300 g/ft$^3$ of Barium sulfate, before mixing for at least 1 hr.
4. Added was an appropriate amount of binder before mixing for 1 hr.
5. Solids were adjusted to 30%, thickening agent was added before mixing overnight.
6. 50-55% from the inlet end of a 1×3 inch ceramic substrate core was coated, dried with air cure, then coated 50-55% dose length from the outlet end.
7. The brick was fired at 500° C. for 30 min in a static oven.

Reference Example B9: Fully Formulated Single Layer Pt Washcoat

1. A solution was prepared with the required amount of Pt nitrate (with Pt loading 20 g/ft$^3$).
2. Added were 1 g/in$^3$ of stabilized alumina powder, and 1 g/in$^3$ of CZO material.
3. The pH was adjusted to 5-7 with ammonia, before mixing for 1 hr.
4. Solids were adjusted to 30%.
5. An appropriate amount of thickening agent was added, before mixing overnight.
6. 1×3 inch ceramic substrate cores were coated targeting 1.2 inch dose from the inlet end, then dried with air cure.
7. The brick was fired at 500° C. for 30 min in a static oven.

Example B10: Fully Formulated Single Layer Pt Washcoat with 20% CMO Modified CZO 1. A solution was prepared with the required amount of Pt nitrate (with Pt loading 20 g/ft$^3$).
2. Added were 1 g/in$^3$ of stabilized alumina powder, and 1 g/in$^3$ of 20% CaMnO$_3$ modified CZO (A11).
3. The pH was adjusted to 5-7 with ammonia, before mixing for 1 hr.
4. Solids were adjusted to 30%.
5. An appropriate amount of thickening agent was added, before mixing overnight.
6. 1×3 inch ceramic substrate cores were coated targeting 1.2 inch dose from the inlet end, then dried with air cure.
7. The brick was fired at 500° C. for 30 min in a static oven.

Reference Example B11: Fully Formulated Single Layer RhPt Washcoat

1. Rh nitrate (with Rh loading 3.6 g/ft$^3$) was added to a slurry of CZO (1.1 g/in$^3$), and mixed for at least 15 min.
2. The pH was adjusted to >6 with ammonia; before mixing for at least 1 hour.
3. An alumina slurry (0.4 g/in$^3$) and Platinum nitrate (with Pt loading 3.6 g/ft$^3$) were added, before mixing for at least 15 min.
4. The pH was adjusted to >6 with ammonia; before mixing for at least 30 min.
5. An appropriate amount of binder was added, before mixing for at least 30 min.
6. Solids were adjusted to target of ~25% and thickening agent as added, before mixing overnight.
7. 50-55% from the inlet end of a 1×3 inch ceramic substrate core was coated, dried with air cure, then coated 50-55% dose length from the outlet end.
8. The brick was fired at 500° C. for 30 min in a static oven.

Example B12: Fully Formulated Single Layer RhPt Washcoat with 10% BMO Modified CZO 1. Rh nitrate (with Rh loading 3.6 g/ft$^3$) was added to a slurry of 10% BaMnO$_3$ modified CZO (A3, 1.1 g/in$^3$), and mixed for at least 15 min.
2. The pH was adjusted to >6 with ammonia; before mixing for at least 1 hour.
3. A stabilized alumina slurry (0.4 g/in$^3$) and Platinum nitrate (with Pt loading 3.6 g/ft$^3$) were added, before mixing for at least 15 min.
4. The pH was adjusted to >6 with ammonia; before mixing for at least 30 min.
5. An appropriate amount of binder was added, before mixing for at least 30 min.
6. Solids were adjusted to target of ~25% and thickening agent as added, before mixing overnight.
7. 50-55% from the inlet end of a 1×3 inch ceramic substrate core was coated, dried with air cure, then coated 50-55% dose length from the outlet end.
8. The brick was fired at 500° C. for 30 min in a static oven.

Example B13: Fully Formulated Single Layer RhPt Washcoat with 10% LMO Modified CZO 1. Rh nitrate (with Rh loading 3.6 g/ft$^3$) was added to a slurry of 10% La$_{0.9}$MnO$_3$ modified CZO (A8, 1.1 g/in$^3$), and mixed for at least 15 min.
2. The pH was adjusted to >6 with ammonia; before mixing for at least 1 hour.
3. A stabilized alumina slurry (0.4 g/in$^3$) and Platinum nitrate (with Pt loading 3.6 g/ft$^3$) were added, before mixing for at least 15 min.
4. The pH was adjusted to >6 with ammonia; before mixing for at least 30 min.
5. An appropriate amount of binder was added, before mixing for at least 30 min.
6. Solids were adjusted to target of ~25% and thickening agent as added, before mixing overnight.
7. 50-55% from the inlet end of a 1×3 inch ceramic substrate core was coated, dried with air cure, then coated 50-55% dose length from the outlet end.
8. The brick was fired at 500° C. for 30 min in a static oven.

Example B14: Fully Formulated Single Layer RhPt Washcoat with 10% CMO Modified CZO 1. Rh nitrate (with Rh loading 3.6 g/ft$^3$) was added to a slurry of 10% CaMnO$_3$ modified CZO (A10, 1.1 g/in$^3$), and mixed for at least 15 min.
2. The pH was adjusted to >6 with ammonia; before mixing for at least 1 hour.

3. A stabilized alumina slurry (0.4 g/in$^3$) and Platinum nitrate (with Pt loading 3.6 g/ft$^3$) were added, before mixing for at least 15 min.
4. The pH was adjusted to >6 with ammonia; before mixing for at least 30 min.
5. An appropriate amount of binder was added, before mixing for at least 30 min.
6. Solids were adjusted to target of ~25% and thickening agent as added, before mixing overnight.
7. 50-55% from the inlet end of a 1×3 inch ceramic substrate core was coated, dried with air cure, then coated 50-55% dose length from the outlet end.
8. The brick was fired at 500° C. for 30 min in a static oven.

C. Results and Testing

FIG. 1 shows a powder XRD pattern of 10% BaMnO$_3$-modified CZO according to the Example A1.

Figure 2:
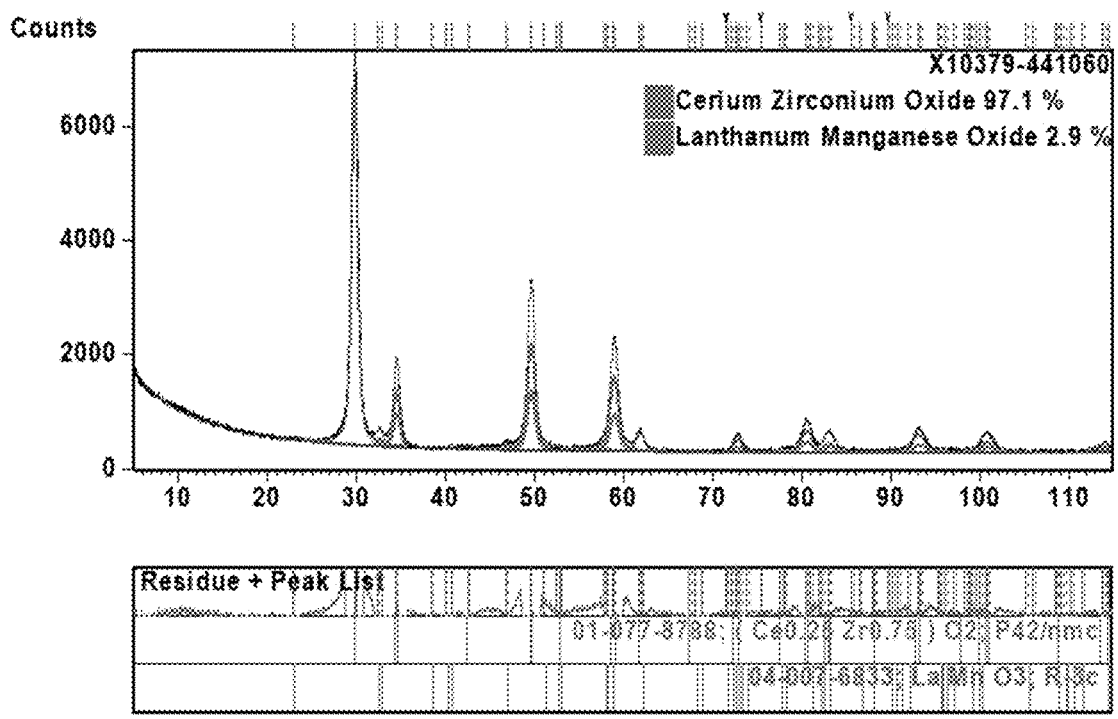
FIG. 2 shows a powder XRD pattern of 10% $La_{0.9}MnO_3$-modified CZO according to the Example A6.

FIG. 2 shows a powder XRD pattern of 10% La$_{0.9}$MnO$_3$-modified CZO according to the Example A6. Both perovskite phases were highly dispersed and were detected by XRD.

FIG. 3 shows OSC of selected perovskite-modified CZO samples. After surface modification with the perovskite phases, the total OSC of CZO support was significantly improved. In particular, samples including conventional CZO, (A3) 10% BaMnO$_3$-modified CZO, (A8) 10% La$_{0.9}$MnO$_3$-modified CZO, (A10) 10% CaMnO$_3$-modified CZO, and (A12) 10% LaFeO$_3$-modified CZO were tested. During the OSC measurement, a powder sample was pre-oxidized at each temperature, and CO was subsequently flowed through the sample, when CO was converted to CO$_2$ by the oxygen species donated from the powder sample. The total OSC of the solid sample therefore corresponds to the amount of CO$_2$ produced per gram of sample. Low temperature (≤350° C.) OSC of these modified CZO samples reached as high as 0.25 to 0.8 mmol CO$_2$ prod./g, while high temperature (>500° C.) OSC of these samples reached as high as 0.75 to 0.95 mmol CO$_2$ prod./g.

FIG. 4a, FIG. 4b and FIG. 4c, respectively, show TWC light off performance (NO$_x$ conversion, CO conversion and THC conversion) of single CZO vs. modified CZO supported Pd catalysts. In particular, the figures show perturbated aged TWC light off performance for (a) NO$_x$, (b) CO, and (c) THC conversions of washcoated (B1) Reference Pd catalyst (aged) on single CZO support, and Pd catalysts (aged) on (B2) BaMnO$_3$-type perovskite-modified CZO support. Reaction condition: with rich pre-treatment, 150-700° C., λ∞0.96~1.04, GHSV=200,000 hr$^{-1}$. The modified support was synthesized via Pechini method. Compared to the reference catalyst, improvements in TWC conversions were shown with the BaMnO$_3$ perovskite-modified support, especially with NO$_x$ conversion.

FIG. 5a, FIG. 5b and FIG. 5c, respectively, show TWC light off performance (NO$_x$ conversion, CO conversion and THC conversion) of single CZO vs. modified CZO supported Rh catalysts. In particular, the figures show perturbated aged TWC light off performance for (a) NO$_x$, (b) CO, and (c) THC conversions of washcoated (B3) Reference Rh catalyst (aged) on single CZO support, and Rh catalysts (aged) on (B4) La$_{0.9}$MnO$_3$-, and (B5) LaFeO$_3$-type perovskite-modified CZO supports. Reaction condition: with rich pre-treatment, 150-700° C., λ=0.96~1.04, GHSV=200,000 hr$^{-1}$. The modified supports were synthesized via incipient wetness impregnation method. Compared to the reference catalyst, pronounced improvements in TWC conversions were shown with perovskite-modified supports.

FIG. 6a, FIG. 6b and FIG. 6c, respectively, show TWC light off performance (NO$_x$ conversion, CO conversion and THC conversion) of fully formulated Pd catalysts with perovskite-modified supports vs a reference Pd catalyst. In particular, the figures show perturbated aged TWC light off performance for (a) NO$_x$, (b) CO, and (c) THC conversions of washcoated (B6) reference Pd fully formulated catalyst (aged), and Pd catalysts (aged) with (B7) 10% BaMnO$_3$-, and (B8) 10% LaFeO$_3$ modified CZO-type perovskite-modified CZO supports. Reaction condition: with rich pre-treatment, 150-700° C., λ=0.96~1.04, GHSV=200,000 hr$^{-1}$. Compared to the reference Pd (100 g/ft$^3$ Pd loading), significant improvements in TWC conversions were shown with perovskite-modified supports. The order of overall TWC activity follows the order of Pd catalyst with 10% BaMnO$_3$-CZO>10% LaFeO$_3$-CZO>reference Pd (at 100 g/ft$^3$).

FIG. 7a, FIG. 7b and FIG. 7c, respectively, show TWC light off performance (NO$_x$ conversion, CO conversion and THC conversion) of fully formulated Pt catalysts with perovskite-modified supports vs a reference Pt catalyst. In particular, the figures show perturbated aged TWC light off performance for (a) NO$_x$, (b) CO, and (c) THC conversions of washcoated (B9) reference Pt (aged) fully formulated catalyst, and Pt catalysts (aged) with (B10) 20% CaMnO$_3$-modified CZO support. Reaction condition: with rich pre-treatment, 150-700° C., λ=0.96~1.04, GHSV=200,000 hr$^{-1}$. Compared to the reference Pt catalyst, significant improvements in TWC conversions were shown with selected perovskite-modified support.

FIG. 8a, FIG. 8b and FIG. 8c, respectively, show TWC light off performance (NO$_x$ conversion, CO conversion and THC conversion) of fully formulated RhPt bimetallic catalysts with perovskite-modified support vs a reference RhPt catalyst. In particular, the figures show perturbated aged TWC light off performance for (a) NO$_x$, (b) CO, and (c) THC conversions of washcoated (B11) reference RhPt (aged) fully formulated catalyst, and RhPt catalysts (aged) with (B12) 10% BaMnO$_3$-, (B13) 10% La$_{0.9}$MnO$_3$-, and (B14) 10% CaMnO$_3$-modified CZO supports. Reaction condition: with rich pre-treatment, 150-700° C., λ=0.96~1.04, GHSV=200,000 hr$^{-1}$. Compared to the reference RhPt catalyst, significant improvements in TWC conversions were shown with selected perovskite-modified support, following the order of: RhPt with 10% CaMnO$_3$-CZO>10% La$_{0.9}$MnO$_3$-CZO>10% BaMnO$_3$-CZO.

The foregoing detailed description has been provided by way of explanation and illustration, and is not intended to limit the scope of the appended claims. Many variations in the presently preferred embodiments illustrated herein will be apparent to one of ordinary skill in the art and remain within the scope of the appended claims and their equivalents.

The invention claimed is:

1. A composition comprising a ceria-zirconia mixed oxide, the ceria-zirconia mixed oxide being surface-modified with a perovskite type compound of formula (I);
  wherein formula (I) is defined by $A_{x-y}A'_yB_{1-z}B'_zO_3$;
    where:
    A is an ion of a metal selected from the group consisting of Li, Na, K, Cs, Mg, Sr, Ba, Ca, Y, Ce, Pr, Nd, and Gd;
    A' is an ion of a metal selected from the group consisting of Li, Na, K, Cs, Mg, Sr, Ba, Ca, Y, Ce, Pr, Nd, and Gd;
    B is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;

B' is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;

x is from 0.7 to 1;

y is from 0 to 0.5; and z is from 0 to 0.5.

2. The composition of claim 1, wherein A and/or A' is an ion of a metal selected from the group consisting of Ca, Ba, and Sr.

3. The composition of claim 1, wherein B and/or B' is an ion of a metal selected from the group consisting of Mn, Zr, and Fe.

4. The composition of claim 1, wherein x is from 0.8 to 1.

5. The composition of claim 1, wherein y is from 0 to 0.3.

6. The composition of claim 1, wherein z is from 0 to 0.4.

7. The composition of claim 1, wherein the ceria-zirconia mixed oxide is doped.

8. The composition of claim 7, wherein the ceria-zirconia mixed oxide is doped with an oxide of one or more of La, Ba, Sr, Mg, Mn, Y, Nd, Pr, Ti, Fe, Cu, Co, Zn, Si, Al and Ni.

9. The composition of claim 1, wherein the composition comprises from 1 to 50 wt. % of the perovskite type compound, based on the total weight of the perovskite type compound and the ceria-zirconia mixed oxide.

10. A catalyst article comprising a substrate, wherein the substrate having the composition according to claim 1 disposed thereon.

11. The catalyst article of claim 10, wherein the catalyst article comprises a three-way catalyst (TWC).

12. The catalyst article of claim 10, wherein a platinum group metal (PGM) is supported on the composition.

13. The catalyst article of claim 12, wherein the PGM comprises Pt, Pd, Rh, or a mixture or alloy thereof.

14. The catalyst article of claim 10, having a washcoat loading of from 1 g/in$^3$ to 3 g/in$^3$.

15. The catalyst article of claim 10, wherein the substrate comprises a wall-flow filter substrate.

16. The catalyst article of claim 10, wherein the substrate comprises a flow-through substrate.

17. A method of manufacturing a composition comprising a ceria-zirconia mixed oxide, the ceria-zirconia mixed oxide being surface-modified with a perovskite type compound of formula (I);

wherein formula (I) is defined by $A_{x-y}A'_{y}B_{1-z}B'_{z}O_3$; where:

A is an ion of a metal selected from the group consisting of Li, Na, K, Cs, Mg, Sr, Ba, Ca, Y, Ce, Pr, Nd, and Gd;

A' is an ion of a metal selected from the group consisting of Li, Na, K, Cs, Mg, Sr, Ba, Ca, Y, Ce, Pr, Nd, and Gd;

B is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;

B' is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;

x is from 0.7 to 1;

y is from 0 to 0.5; and z is from 0 to 0.5, the method comprising:

providing a solution comprising an organic acid, water, one or more salts of A, one or more salts of B and optionally one or more salts of A' and/or one or more salts of B';

contacting the solution with a ceria-zirconia mixed oxide to form a slurry; and heating the slurry.

18. A method of manufacturing a composition comprising a ceria-zirconia mixed oxide, the ceria-zirconia mixed oxide being surface-modified with a perovskite type compound of formula (I);

wherein formula (I) is defined by $A_{x-y}A'_{y}B_{1-z}B'_{z}O_3$; where:

A is an ion of a metal selected from the group consisting of Li, Na, K, Cs, Mg, Sr, Ba, Ca, Y, La, Ce, Pr, Nd, and Gd;

A' is an ion of a metal selected from the group consisting of Li, Na, K, Cs, Mg, Sr, Ba, Ca, Y, La, Ce, Pr, Nd, and Gd;

B is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;

B' is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;

x is from 0.7 to 1;

y is from 0 to 0.5; and z is from 0 to 0.5, the method comprising:

contacting a ceria-zirconia mixed oxide with A, B, and optionally A' and/or B' using one or more salts of A, one or more salts of B and optionally one or more salts of A' and/or one or more salts of B' via incipient wetness impregnation to form an impregnated ceria-zirconia mixed oxide; and heating the impregnated ceria-zirconia mixed oxide.

19. A method of manufacturing a composition comprising a ceria-zirconia mixed oxide, the ceria-zirconia mixed oxide being surface-modified with a perovskite type compound of formula (I);

wherein formula (I) is defined by $A_{x-y}A'_{y}B_{1-z}B'_{z}O_3$; where:

A is an ion of a metal selected from the group consisting of Li, Na, K, Cs, Mg, Sr, Ba, Ca, Y, La, Ce, Pr, Nd, and Gd;

A' is an ion of a metal selected from the group consisting of Li, Na, K, Cs, Mg, Sr, Ba, Ca, Y, La, Ce, Pr, Nd, and Gd;

B is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;

B' is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;

x is from 0.7 to 1;

y is from 0 to 0.5; and z is from 0 to 0.5, the method comprising:

providing a solution comprising one or more salts of A, one or more salts of B and optionally one or more salts of A' and/or one or more salts of B';

contacting the solution with a ceria-zirconia mixed oxide to form a slurry;

spray-drying the slurry to form a spray-dried powder; and heating the spray-dried powder.

20. A method of manufacturing a composition comprising a ceria-zirconia mixed oxide, the ceria-zirconia mixed oxide being surface-modified with a perovskite type compound of formula (I);

wherein formula (I) is defined by $A_{x-y}A'_{y}B_{1-z}B'_{z}O_3$; where:

A is an ion of a metal selected from the group consisting of Li, Na, K, Cs, Mg, Sr, Ba, Ca, Y, La, Ce, Pr, Nd, and Gd;

A' is an ion of a metal selected from the group consisting of Li, Na, K, Cs, Mg, Sr, Ba, Ca, Y, La, Ce, Pr, Nd, and Gd;

B is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;

B' is an ion of a metal selected from the group consisting of Cu, Mn, Mo, Co, Fe, Ni, Cr, Ti, Zr, Al, Ga, Sc, Nb, V, W, Bi, Zn, Sn, Pt, Rh, Pd, Ru, Au, Ag, and Ir;

$x$ is from 0.7 to 1;

$y$ is from 0 to 0.5; and $z$ is from 0 to 0.5, the method comprising:

providing an aqueous solution comprising one or more salts of A, one or more salts of B and optionally one or more salts of A' and/or one or more salts of B';

contacting the solution with a ceria-zirconia mixed oxide to form a slurry;

contacting the slurry with a base;

recovering a solid residue from the slurry; and heating the solid residue.

* * * * *